United States Patent
Khan et al.

(10) Patent No.: US 6,275,840 B1
(45) Date of Patent: Aug. 14, 2001

(54) FAST OVERFLOW DETECTION IN DECODED BIT-VECTOR ADDITION

(75) Inventors: Umair A. Khan, Fremont; Wolf C. Witt, Mountain View, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/209,093

(22) Filed: Dec. 10, 1998

(51) Int. Cl.$^7$ ........................................................ G06F 7/52
(52) U.S. Cl. ............................................................ 708/552
(58) Field of Search ...................... 708/552, 498, 708/670

(56) References Cited

U.S. PATENT DOCUMENTS

| | | | |
|---|---|---|---|
| 5,299,145 | * 3/1994 | Yoshida | 708/670 |
| 5,463,573 | * 10/1995 | Yoshida | 708/670 |
| 5,467,298 | * 11/1995 | Yoshida | 708/670 |
| 5,905,662 | * 5/1999 | Shiraishi | 708/552 |
| 6,012,077 | * 1/2000 | Tai | 708/552 |
| 6,069,497 | * 5/2000 | Blomgren et al. | 326/105 |

* cited by examiner

*Primary Examiner*—David H. Malzahn
(74) *Attorney, Agent, or Firm*—Blakely, Sokoloff, Taylor & Zafman LLP

(57) ABSTRACT

A method for detecting overflow in an add operation on first and second decoded bit-vectors is provided, the method including generating a one-ahead vector using the first decoded bit-vector. The method also includes selecting an overflow bit from bits of the one-ahead vector using the second decoded bit-vector.

30 Claims, 10 Drawing Sheets

FAST OVERFLOW DETECTION IN DECODED BIT-VECTOR ADDITION

BACKGROUND OF THE INVENTION

1. Field of the Invention

This invention relates generally to the field of semiconductor microprocessors, and, more particularly, to the way that overflows are detected when decoded bit-vectors are added together.

2. Description of the Related Art

Decoded bit-vectors appear frequently in high-speed logic design. Decoded bit-vectors (also known as "one-hot encoded bit-vectors") are needed for multiplexer (MUX) control, generally simplify control logic and can be added together faster than vectors in encoded form. For example, fast SHIFT operations may be readily used with decoded bit-vectors. A function frequently needed when decoded bit-vectors are added together is the detection of an overflow. Indeed, whether an overflow occurs or not is sometimes more interesting than the numerical value of the sum of the decoded bit-vectors.

An (N+1)-bit decoded bit-vector $A = a_N a_{N-1} a_{N-2} a_{N-3} \cdots a_{k+1} a_k a_{k-1} \cdots a_3 a_2 a_1 a_0$ may represent any number from 0 to N. Only one of the bits $A[i] = a_i$ for any i between 0 and N is different from zero (0) and is set equal to one (1). The number represented by the decoded bit-vector is equal to the number of zeros (0's) to the right of the non-zero bit. For example, the number n is represented by $n = A = a_N a_{N-1} a_{N-2} \cdots a_{n+1} a_n a_{n-1} \cdots a_2 a_1 a_0$ where $A[k] = a_k = 0$ for k n, and $A[n] = a_n = 1$. More particularly, for N =9, the 10-bit decoded bit-vector representing 4 is 0000010000 and the 10-bit decoded bit-vector representing 3 is 0000001000, for example.

Adding two decoded bit-vectors may be effected by a shift left operation. A first one of the two decoded bit-vectors may be input into a shifter and then the 1 of that input decoded bit-vector may be shifted left by the number of zeros (0's) to the right of the 1 of the second one of the two decoded bit-vectors. For example, adding the 10-bit decoded bit-vector representing 4 (0000010000) to the 10-bit decoded bit-vector representing 3 (0000001000) may be effected by inputting 0000010000 (4) into a shifter and then shifting the 1 of 0000010000 (4) three places to the left, yielding the 10-bit decoded bit-vector result 0010000000 (7).

FIG. 1 illustrates a conventional implementation of 10-bit decoded bit-vector addition using MUXes with ten 2-AND gates and a 10-OR (as shown explicitly in MUX 100) that is 10 bits wide (ten 10-ORs in parallel, for example, as shown with MUXes 100–190). As shown in FIG. 1, the first one of the two 10-bit decoded bit-vectors X (0000010000, corresponding to 4) is input into each of ten MUXes 100–190 with the least significant bit (LSB, 0 here) at the top and with the most significant bit (MSB, 0 here) at the bottom. Then, in leftmost MUX 100, whose output will be the MSB of the result, the second one of the two 10-bit decoded bit-vectors Y (0000001000, corresponding to 3) is input into MUX 100 with the MSB (0 here) at the top and with the LSB (0 here) at the bottom. Consequently, the LSB of X is 2-ANDed with the MSB of Y, the MSB of X is 2-ANDed with the LSB of Y and all the respective intervening bits are similarly 2-ANDed together, as shown in FIG. 1.

As further shown in FIG. 1, Y (0000001000, corresponding to 3) is input into MUX 110, whose output will be the next to MSB of the result, with the 1 bit shifted upward one place (giving 0000010000, corresponding to 4, reading from MSB to LSB). Similarly, Y (0000001000, corresponding to 3) is input into MUX 120 with the 1 bit shifted upward two places (giving 0000100000, corresponding to 5), into MUX 130 with the 1 bit shifted upward three places (giving 0001000000, corresponding to 6), into MUX 140 with the 1 bit shifted upward four places (giving 0010000000, corresponding to 7), into MUX 150 with the 1 bit shifted upward five places (giving 0100000000, corresponding to 8) and into MUX 160 with the 1 bit shifted upward six places (giving 1000000000, corresponding to 9). The outputs of each of the ten 2-AND gates in each of MUXes 100–160 are ORed together to yield the seven MSBs (0010000) of the result X+Y.

Moreover, as shown in FIG. 1, Y (0000001000, corresponding to 3) is input into MUX 170, whose output will be the third LSB of the result, with the 1 bit shifted downward three places (giving 0000000001, corresponding to 0, reading from MSB to LSB). Similarly, Y (0000001000, corresponding to 3) is input into MUX 180 with the 1 bit shifted downward two places (giving 0000000010, corresponding to 1) and into MUX 190 with the 1 bit shifted downward one place (giving 0000000100, corresponding to 2). The outputs of each of the ten 2-AND gates in each of MUXes 170–190 are ORed together to yield the three LSBs (000) of the result X+Y. Putting together the seven MSBs (0010000) and the three LSBs (000) gives the final result X+Y=0010000000, corresponding to 7=4+3.

Taking another example, as shown in the conventional design of FIG. 2, the first one of the two 10-bit decoded bit-vectors X (0000010000, corresponding to 4) is input into each of ten MUXes 200–290 with the least significant bit (LSB, 0 here) at the top and with the most significant bit (MSB, 0 here) at the bottom. Then, in leftmost MUX 200, whose output will be the MSB of the result, the second one of the two 10-bit decoded bit-vectors Z (0000100000, corresponding to 5) is input into MUX 200 with the MSB (0 here) at the top and with the LSB (0 here) at the bottom. Consequently, the LSB of X is 2-ANDed with the MSB of Z, the MSB of X is 2-ANDed with the LSB of Z and all the respective intervening bits are similarly 2-ANDed together, as shown in FIG. 2.

As further shown in FIG. 2, Z (0000100000, corresponding to 5) is input into MUX 210, whose output will be the next to MSB of the result, with the 1 bit shifted upward one place (giving 0001000000, corresponding to 6, reading from MSB to LSB). Similarly, Z (0000100000, corresponding to 5) is input into MUX 220 with the 1 bit shifted upward two places (giving 0010000000, corresponding to 7), into MUX 230 with the 1 bit shifted upward three places (giving 0100000000, corresponding to 8) and into MUX 240 with the 1 bit shifted upward four places (giving 1000000000, corresponding to 9). The outputs of each of the ten 2-AND gates in each of MUXes 200–240 are ORed together to yield the five MSBs (10000) of the result X+Z.

Moreover, as shown in FIG. 2, Z (0000100000, corresponding to 5) is input into MUX 250, whose output will be the fifth LSB of the result, with the 1 bit shifted downward five places (giving 0000000001, corresponding to 0, reading from MSB to LSB). Similarly, Z (0000100000, corresponding to 5) is input into MUX 260 with the 1 bit shifted downward four places (giving 0000000010, corresponding to 1), into MUX 270 with the 1 bit shifted downward three places (giving 0000000100, corresponding to 2), into MUX 280 with the 1 bit shifted downward two places (giving 0000001000, corresponding to 3) and into MUX 290 with the 1 bit shifted downward one place (giving 0000010000, corresponding to 4). The outputs of each of the ten 2-AND gates in each of MUXes 250–290 are ORed together to yield the five LSBs (00000) of the result X+Z. Putting together the five MSBs (10000) and the five LSBs (00000) gives the final result X+Z=1000000000, corresponding to 9=4+5.

When two (N+1)-bit decoded bit-vectors $A=a_N a_{N-1} a_{N-2} a_{N-3} \ldots a_{n+1} a_n a_{n-1} \ldots a_3 a_2 a_1 a_0$ (corresponding to n, so that $a_n=1$ and $a_i=0$ for i≠n) and $B=b_N b_{N-1} b_{N-2} b_{N-3} \ldots b_{m+1} b_m b_{m-1} \ldots b_3 b_2 b_1 b_0$ (corresponding to m, so that $b_m=1$ and $b_i=0$ for i≠m) add up to a number n+m less than or equal to N, then N−m+1 MUXes similar to MUXes 100–160 of FIG. 1 and MUXes 200–240 of FIG. 2 may be used to generate the N−m+1 MSBs of the result A+B, and m MUXes similar to MUXes 170–190 of FIG. 1 and MUXes 250–290 of FIG. 2 may be used to generate the m LSBs of the result A+B, with A input into all of the MUXes with the LSB $a_0$ at the top and the MSB $a_N$ at the bottom. Alternatively, N−n+1 MUXes similar to MUXes 100–160 of FIG. 1 and MUXes 200–240 of FIG. 2 may be used to generate the N−n+1 MSBs of the result A+B, and n MUXes similar to MUXes 170–190 of FIG. 1 and MUXes 250–290 of FIG. 2 may be used to generate the n LSBs of the result A+B, with B input into all of the MUXes with the LSB $b_0$ at the top and the MSB $b_N$ at the bottom.

In particular, when one of the two (N+1)-bit decoded bit-vectors $A=a_N a_{N-1} a_{N-2} a_{N-3} \ldots a_{n+1} a_n a_{n-1} \ldots a_3 a_2 a_1 a_0$ corresponds to n=0, so that $a_0=1$ and $a_i=0$ for i=1, 2, ..., N, and $B=b_N b_{N-1} b_{N-2} b_{N-3} \ldots b_{m+1} b_m b_{m-1} \ldots b_3 b_2 b_1 b_0$ corresponds to m, so that $b_m=1$ and $b_i=0$ for i≠m, then adding A+B always yields a number 0+m=m that is less than or equal to N. The leftmost MUX gives the MSB of the result, which is OR(AND($b_N$, $a_0$), AND($b_{N-1}$, $a_1$), ..., AND($b_2$, $a_{N-2}$), AND($b_1$, $a_{N-1}$), AND($b_0$, $a_N$))=$b_N$, since $a_0=1$ and $a_i=0$ for i=1, 2, ..., N.

Here, OR(x, y, ..., z) is the inclusive logical OR operation, and AND (r, s) is the logical AND operation. Where at most one of x, y, ..., z is equal to 1, with all the rest of x, y, ..., z equal to 0, the output of OR(x, y, ..., z) is equivalent to the sum x+y+ ... +z. Where r and s are each either 1 or 0, the output of AND(r, s) is equivalent to the product (rs).

The next to leftmost MUX gives the next to leftmost MSB of the result, which is OR(AND($b_{N-1}$, $a_0$), AND($b_{N-2}$, $a_1$), ..., AND($b_1$, $a_{N-2}$), AND($b_0$, $a_{N-1}$), AND($b_N$, $a_N$))=$b_{N-1}$, again since $a_0=1$ and $a_i=0$ for i=1, 2, ..., N. The next to the next to leftmost MUX gives the next to the next to leftmost MSB of the result, which is OR(AND($b_{N-2}$, $a_0$), AND($b_{N-3}$, $a_1$), ..., AND($b_0$, $a_{N-2}$), AND($b_N$, $a_{N-1}$), AND($b_{N-1}$, $a_N$))=$b_{N-2}$, again since $a_0=1$ and $a_i=0$ for i=1, 2, ..., N.

Similarly, the rightmost MUX gives the LSB of the result, which is OR(AND($b_0$, $a_0$), AND($b_N$, $a_1$), ..., AND($b_3$, $a_{N-2}$), AND($b_2$, $a_{N-1}$), AND($b_1$, $a_N$))=$b_0$, since $a_0=1$ and $a_i=0$ for i=1, 2, ..., N. The next to rightmost MUX gives the next to rightmost LSB of the result, which is OR(AND($b_1$, $a_0$), AND($b_0$, $a_1$), ..., AND($b_4$, $a_{N-2}$), AND($b_3$, $a_{N-1}$), AND($b_2$, $a_N$))=$b_1$, again since $a_0=1$ and $a_i=0$ for i=1, 2, ..., N. The next to the next to rightmost MUX gives the next to the next to rightmost LSB of the result, which is OR(AND($b_2$, $a_0$), AND($b_1$, $a_1$). ..., AND($b_5$, $a_{N-2}$), AND($b_4$, $a_{N-1}$), AND($b_3$, $a_N$))=$b_2$, again since $a_0=1$ and $a_i=0$ for i=1, 2, ..., N. The net result is $B=b_N b_{N-1} b_{N-2} b_{N-3} \ldots b_{m+1} b_m b_{m-1} \ldots b_3 b_2 b_1 b_0$, which is the expected result of adding 0+B.

Overflow occurs when two (N+1)-bit decoded bit-vectors $A=a_N a_{N-1} a_{N-2} a_{N-3} \ldots a_{n+1} a_n a_{n-1} \ldots a_3 a_2 a_1 a_0$ (n) and $B=b_N b_{N-1} b_{N-2} b_{N-3} \ldots b_{m+1} b_m b_{m-1} \ldots b_3 b_2 b_1 b_0$ (m) add up to a number n+m larger than N. As discussed above, adding two decoded bit-vectors may be effected by a shift left operation. The first one of the two decoded bit-vectors may be input into a shifter and then the 1 of that input decoded bit-vector may be shifted left by the number of zeros (0's) to the right of the 1 of the second of the two decoded bit-vectors. For example, adding the 10-bit decoded bit-vector representing 7 (0010000000) to the 10-bit decoded bit-vector representing 5 (0000100000) may be effected by inputting 0000100000 (5) into a shifter and then shifting the 1 of 0000100000 (5) seven places to the left, yielding the 19-bit decoded bit-vector result 0000001000000000000 (12), where the 1 appears in the 9 overflow bits. Since the addition of two (N+1)-bit decoded bit-vectors A (n) and B (m) add up to a number n+m that is always less than or equal to 2N, the result may always be represented by a (2N+1)-bit decoded bit-vector $C=c_{2N} c_{2N-1} c_{2N-2} \ldots c_{n+m+1} c_{n+m} c_{n+m-1} \ldots c_2 c_1 c_0$ (n+m). The N leftmost MSBs are the overflow bits.

A conventional approach to overflow detection is to add two decoded bit-vectors together and detect whether a 1 appears in the overflow bits. For example, in the addition of two (N+1)-bit decoded bit-vectors A (n) and B (m) that results in C (n+m), the N leftmost MSBs (the overflow bits) may be ORed together to give OR($c_{2N}, c_{2N-1}, c_{2N-2}, \ldots, c_{N+3}, c_{N+2}, c_{N+1}$). Alternatively, another conventional approach to overflow detection is to add two decoded bit-vectors together and detect whether a 1 appears in the non-overflow bits. If a 1 appears as an output of MUXes with non-shifted or upward-shifted inputs, then there is no overflow. For example, the N+1 rightmost LSBs of the resulting (2N+1)-bit decoded bit-vector C (n+m) may be ORed together to give OR($c_N, c_{N-1}, c_{N-2}, \ldots, c_2, c_1, c_0$). In the two examples given above (7=4+3 and 9=4+5), 1's appeared in the outputs of MUXes with non-shifted or upward-shifted inputs (MUX 120 and MUX 200, respectively) and, indeed, there was no overflow.

FIG. 3 illustrates a conventional implementation of 10-bit decoded bit-vector addition using MUXes with 2-AND gates and a 10-OR that is 10 bits wide (ten 10-ORs in parallel, for example) in a situation where overflow occurs. As shown in FIG. 3, the first one of the two 10-bit decoded bit-vectors R (0010000000, corresponding to 7) is input into each of ten MUXes 300–390 with the least significant bit (LSB, 0 here) at the top and with the most significant bit (MSB, 0 here) at the bottom. Then, in leftmost MUX 300, whose output would be the MSB of the result if there were no overflow, the second one of the two 10-bit decoded bit-vectors S (0000100000, corresponding to 5) is input into MUX 300 with the MSB (0 here) at the top and with the LSB (0 here) at the bottom. Consequently, the LSB of R is 2-ANDed with the MSB of S, the MSB of R is 2-ANDed with the LSB of S and all the respective intervening bits are similarly 2-ANDed together, as shown in FIG. 3.

As further shown in FIG. 3, S (0000100000, corresponding to 5) is input into MUX 310, whose output would be the MSB of the result if there were overflow (unless R=S=9), with the 1 bit shifted upward one place (giving 0001000000, corresponding to 6, reading from MSB to LSB). Similarly, S (0000100000, corresponding to 5) is input into MUX 320 with the 1 bit shifted upward two places (giving 0010000000, corresponding to 7), into MUX 330 with the 1 bit shifted upward three places (giving 0100000000, corresponding to 8) and into MUX 340 with the 1 bit shifted upward four places (giving 1000000000, corresponding to 9). The outputs of each of the ten 2-AND gates in each of MUXes 310–340 are ORed together to yield the four MSBs (0000) of the result R+S. Since a 1 does not appear as an output of MUXes 300–340 with non-shifted or upward-shifted inputs, there is an overflow and the ten LSBs of the 19-bit result R+S are all zeroes (0000000000).

Moreover, as shown in FIG. 3, S (0000100000, corresponding to 5) is input into MUX 350, whose output will be the fifth LSB of the 9 overflow bits of the result (unless R=S=9), with the 1 bit shifted downward five places (giving 0000000001, corresponding to 0, reading from MSB to LSB). Similarly, S (0000100000, corresponding to 5) is input into MUX 360 with the 1 bit shifted downward four places (giving 0000000010, corresponding to 1), into MUX 370 with the 1 bit shifted downward three places (giving 0000000100, corresponding to 2), into MUX 380 with the 1 bit shifted downward two places (giving 0000001000, corresponding to 3) and into MUX 390 with the 1 bit shifted downward one place (giving 0000010000, corresponding to 4). The outputs of each of the ten 2-AND gates in each of MUXes 350–390 are ORed together to yield the five LSBs (00100) of the 9 overflow bits of the result R+S. Putting together the four MSBs (0000) and the five LSBs (00100) of the 9 overflow bits with the ten LSBs (0000000000) of the 10 non-overflow bits gives the final 19-bit result R+S= 0000001000000000000, corresponding to 12=7+5.

Taking another example, as shown in the conventional design of FIG. 4, the first one of the two 10-bit decoded bit-vectors T (1000000000, corresponding to 9) is input into each of ten MUXes 400–490 with the least significant bit (LSB, 0 here) at the top and with the most significant bit (MSB, 1 here) at the bottom. Then, in leftmost MUX 400, whose output would be the MSB of the result if there were no overflow, the second one of the two 10-bit decoded bit-vectors U (1000000000, also corresponding to 9) is input into MUX 400 with the MSB (1 here) at the top and with the LSB (0 here) at the bottom. Consequently, the LSB of T is 2-ANDed with the MSB of U, the MSB of T is 2-ANDed with the LSB of U and all the respective intervening bits are similarly 2-ANDed together, as shown in FIG. 4. Since a 1 does not appear as an output of MUX 400 with a non-shifted input (as shown in FIG. 4, there is no MUX with an upward-shifted input), there is an overflow and the ten LSBs of the 19-bit result T+U are all zeroes (0000000000).

As further shown in FIG. 4, U (1000000000, corresponding to 9) is input into MUX 410, whose output will be the MSB of the result since there is an overflow, with the 1 bit shifted downward nine places (giving 0000000001, corresponding to 0, reading from MSB to LSB). Similarly, U (1000000000, corresponding to 9) is input into MUX 420 with the 1 bit shifted downward eight places (giving 0000000010, corresponding to 1), into MUX 430 with the 1 bit shifted downward seven places (giving 0000000100, corresponding to 2) and into MUX 440 with the 1 bit shifted downward six places (giving 0000001000, corresponding to 3).

Moreover, as shown in FIG. 4, U (1000000000, corresponding to 9) is input into MUX 450, whose output will be the fifth LSB of the 9 overflow bits of the result, with the 1 bit shifted downward five places (giving 0000010000, corresponding to 4), into MUX 460 with the 1 bit shifted downward four places (giving 0000100000, corresponding to 5), into MUX 470 with the 1 bit shifted downward three places (giving 0001000000, corresponding to 6), into MUX 480 with the 1 bit shifted downward two places (giving 0010000000, corresponding to 7) and into MUX 490 with the 1 bit shifted downward one place (giving 0100000000, corresponding to 8). The outputs of each of the ten 2-AND gates in each of MUXes 410–490 are ORed together to yield all 9 overflow bits (100000000) of the result T+U. Putting together the 9 overflow bits (100000000) with the ten LSBs (0000000000) of the 10 non-overflow bits gives the final 19-bit result T+U=1000000000000000000, corresponding to 18=9+9.

When two (N+1)-bit decoded bit-vectors $A=a_N a_{N-1} a_{N-2} a_{N-3} \ldots a_{n+1} a_n a_{n-1} \ldots a_3 a_2 a_1 a_0$ (corresponding to n, so that $a_n=1$ and $a_i=0$ for i≠n) and $B=b_N b_{N-1} b_{N-2} b_{N-3} \ldots b_{m+1} b_m b_{m-1} \ldots b_3 b_2 b_1 b_0$ (corresponding to m, so that $b_m=1$ and $b_i=0$ for i≠m) add up to a number n+m greater than N, then N−m MUXes similar to MUXes 310–340 of FIG. 3 may be used to generate the N−m MSBs of the result A+B, and m MUXes similar to MUXes 350–390 of FIG. 3 and MUXes 410–490 of FIG. 4 may be used to generate the m LSBs of the N overflow bits of the result A+B, with A input into all of the MUXes with the LSB $a_0$ at the top and the MSB $a_N$ at the bottom. Alternatively, N−n MUXes similar to MUXes 310–340 of FIG. 3 may be used to generate the N-n MSBs of the result A+B, and n MUXes similar to MUXes 350–390 of FIG. 3 and MUXes 410–490 of FIG. 4 may be used to generate the n LSBs of the N overflow bits of the result A+B, with B input into all of the MUXes with the LSB $b_0$ at the top and the MSB $b_N$ at the bottom.

In particular, when one of the two (N+1)-bit decoded bit-vectors $A=a_N a_{N-1} a_{N-2} a_{N-3} \ldots a_{n+1} a_n a_{n-1} \ldots a_3 a_2 a_1 a_0$ corresponds to n=N, so that $a_N=1$ and $a_i=0$ for i=0, 1, 2, . . . , N−1, and $B=b_N b_{N-1} b_{N-2} b_{N-3} \ldots b_{m+1} b_m b_{m-1} \ldots b_3 b_2 b_1 b_0$ corresponds to m>0, so that $b_0=0$, then adding A+B always yields a number N+m that is greater than N. The leftmost MUX gives OR(AND($b_N$, $a_0$), AND($b_{N-1}$,$a_1$), . . . , AND($b_2$, $a_{N-2}$), AND($b_1$, $a_{N-1}$), AND($b_0$, $a_N$))=0, since $a_N=1$, $b_0=0$ and $a_i=0$ for i=0, 1, 2, . . . , N−1.

The next to leftmost MUX gives the MSB of the result, which is $c_{2N}$=OR(AND($b_{N-1}$, $a_0$), AND($b_{N-2}$, $a_1$), . . . , AND($b_1$, $a_{N-2}$), AND($b_0$, $a_{N-1}$), AND($b_N$, $a_N$))=$b_N$, again since $a_N=1$ and $a_i=0$ for i=0, 1, 2, . . . , N−1. The next to the next to leftmost MUX gives the next to leftmost MSB of the result, which is $c_{2N-1}$=OR(AND($b_{N-2}$, $a_0$), AND($b_{N-3}$, $a_1$), . . . , AND($b_0$, $a_{N-2}$), AND($b_N$, $a_{N-1}$), AND($b_{N-1}$, $a_N$))=$b_{N-1}$, again since $a_N=1$ and $a_i=0$ for i=0, 1, 2, . . . , N−1.

Similarly, the rightmost MUX gives the LSB of the N overflow bits of the result, which is $c_{n+1}$=OR(AND($b_0$, $a_0$), AND($b_N$, $a_1$), . . . , AND($b_3$, $a_{N-2}$), AND($b_2$, $a_{N-1}$), AND($b_1$, $a_N$))=$b_1$, since $a_N=1$ and $a_i=0$ for i=0, 1, 2, . . . , N−1. The next to rightmost MUX gives the next to rightmost LSB of the N overflow bits of the result, which is $c_{N+2}$=OR(AND($b_1$, $a_0$), AND($b_0$, $a_1$), . . . , AND($b_4$, $a_{N-2}$), AND($b_3$, $a_{N-1}$), AND($b_2$, $a_N$))=$b_2$, again since $a_N=1$ and $a_i=0$ for i=0, 1, 2, . . . , N−1. The next to the next to rightmost MUX gives the next to the next to rightmost LSB of the N overflow bits of the result, which is $C_{N+3}$=OR(AND($b_2$, $a_0$), AND($b_1$, $a_1$), . . . , AND($b_5$, $a_{N-2}$), AND($b_4$, $a_{N-1}$), AND($b_3$, $a_N$))=$b_3$, again since $a_N=1$ and $a_i=0$ for i=0,1,2, . . . , N−1. Generally, $C_{N+j}=b_j$ for j=1, 2, . . . , N.

The net result is the (2N+1)-bit decoded bit-vector $C=b_N b_{N-1} b_{N-2} b_{N-3} \ldots b_{m+1} b_m b_{m-1} \ldots b_3 b_2 b_1 \ldots c_N c_{N-1} c_{N-2} \ldots c_{n+m+1} c_{n+m} c_{n+m-1} \ldots c_2 c_1 c_0$, where $c_i=0$ for i=0, 1, 2, . . . , N, which is the expected result of adding N+B. The N+1 LSBs $c_N c_{N-1} c_{N-2} \ldots c_{n+m+1} c_{n+m} c_{n+m-1} \ldots c_2 c_1 c_0$ are the N+1 non-overflow bits (all 0's). The N MSBs $b_N b_{N-1} b_{N-2} b_{N-3} \ldots b_3 b_2 b_1 = c_{2N} c_{2N-1} C_{2N-2} c_{2N-3} \ldots c_{N+3} c_{N+2} c_{N+1}$ are the N overflow bits (the N MSBs of B) that, when ORed together, give OR($c_{2N}$,$c_{2N-1}$,$c_{2N-2}$, . . . ,$c_{N+3}$,$c_{N+2}$,$c_{N+1}$)=OR($b_N$, $b_{N-1}$, $b_{N-2}$, . . . , $b_3$, $b_2$, $b_1$)=1, since $b_0=0$ and $b_i$ 0 for i=1, 2, 3, . . . , N, conventionally indicating an overflow.

The time delay for this conventional overflow detection scheme involving adding together two (N+1)-bit decoded bit-vectors using MUXes with 2-AND gates and an (N+1)-OR that is N+1 bits wide (N+1 (N+1)-ORs in parallel, for example) and detecting whether a 1 appears in the overflow bits using an N-OR that is 1 bit wide (one N-OR, for example) may be estimated as follows. The time $t_{2\text{-}AND}$ for using the 2-AND gates in the MUXes may be added to the time $t_{(N+1)\text{-}OR}$[(N+1)-bits wide] for using the N+1 (N+1)-ORs in the MUXes and to the time $t_{N\text{-}OR}$[1-bit wide] for using the one N-OR, giving altogether $t_{conventional\text{-}simultaneous} = t_{2\text{-}AND} + t_{(N+1)\text{-}OR}$[(N+1)-bits wide]+ $t_{N\text{-}OR}$[1-bit wide].

The two (N+1)-bit decoded bit-vectors $A = a_N a_{N-1} a_{N-2} a_{N-3} \ldots a_{n+1} a_n a_{n-1} \ldots a_3 a_2 a_1 a_0$ (corresponding to n, so that $a_n=1$ and $a_i=0$ for i n) and $B = b_N b_{N-1} b_{N-2} b_{N-3} \ldots b_{m+1} b_m b_{m-1} \ldots b_3 b_2 b_1 b_0$ (corresponding to m, so that $b_m=1$ and $b_i=0$ for i m) must also arrive simultaneously for this conventional overflow detection scheme to work since the first step involves adding A (n) and B (m) together using MUXes with 2-AND gates. If there is signal skew, where A (n) arrives earlier to the MUXes with 2-AND gates than B (m), which arrives at a time $t_{skew}$ later than A (n), then the time $t_{conventional\text{-}skewed} = t_{skew} + t_{conventional\text{-}simultaneous} = t_{skew} + t_{2\text{-}AND} + t_{(N+1)\text{-}OR}$[(N+1)-bits wide]+$t_{N\text{-}OR}$[1-bit wide].

Using N+1 transmission gates (T-gates) to implement MUXes in the conventional approach to overflow detection is a conventional technique for accommodating signal skew. The earlier arriving decoded bit-vector, A (n) for example, may be used to control the shift MUX that will be used to shift the later arriving decoded bit-vector, B (m) for example. The respective T-gate would already be opened or closed depending on the bits of A (n) (the T-gate control) by the time the bits of B (m) (the T-gate data) arrive. The time delay for the N+1 T-gate MUXes would then be just the data-to-out time $t_{data\text{-}to\text{-}out}$[(N+1)-bits wide] instead of the time delay ($t_{2\text{-}AND} + t_{(N+1)\text{-}OR}$[(N+1)-bits wide]) through N+1 regular AND/OR MUXes. The total T-gate time delay would then be the time $t_{conventional\text{-}skewed\text{-}T\text{-}gate} = t_{skew} + t_{data\text{-}to\text{-}out}$[(N+1)-bits wide]+$t_{N\text{-}OR}$[1-bit wide]. However, if the input size N is large, the N+1 T-gate MUXes implementation would introduce a large amount of diffusion capacitance at the output of each T-gate. This would increase the data-to-out time $t_{data\text{-}to\text{-}out}$[(N+1)-bits wide] so that the data-to-out time $t_{data\text{-}to\text{-}out}$[(N+1)-bits wide]$>> t_{2\text{-}AND}$.

The present invention is directed to overcoming, or at least reducing the effects of, one or more of the problems set forth above.

SUMMARY OF INVENTION

In one aspect of the present invention, a method for detecting overflow in an add operation on first and second decoded bit-vectors is provided, the method including generating a one-ahead vector using the first decoded bit-vector. The method also includes selecting an overflow bit from bits of the one-ahead vector using the second decoded bit-vector.

BRIEF DESCRIPTION OF THE DRAWINGS

Other objects and advantages of the invention will become apparent upon reading the following detailed description and upon reference to the drawings in which.

Figure 1:
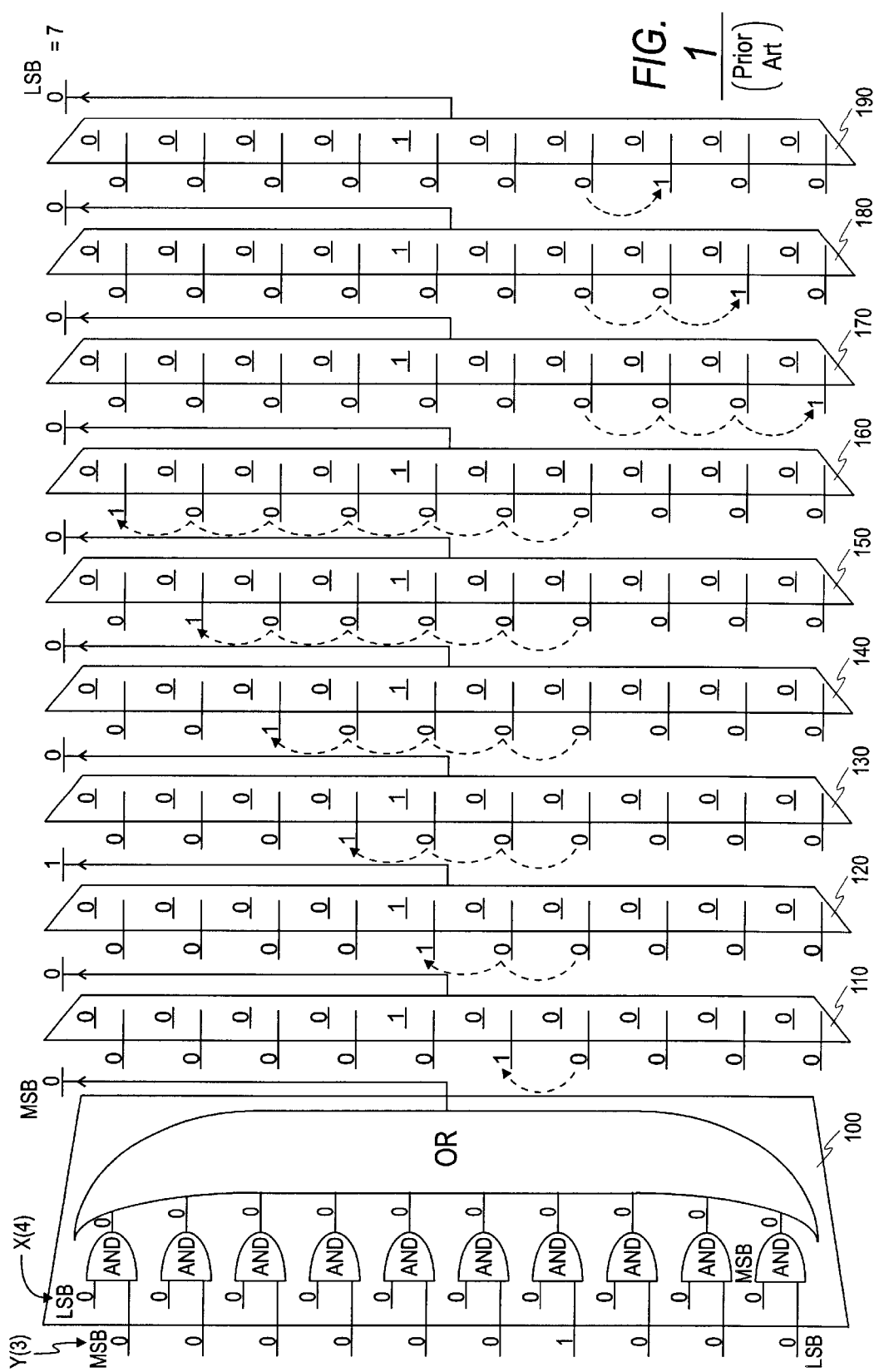
FIG. 1 illustrates an example of a conventional implementation of 10-bit decoded bit-vector addition using MUXes with 2-AND gates and a 10-OR that is 10 bits wide (ten 10-ORs in parallel, for example) in a first situation where overflow does not occur.
Figure 2:
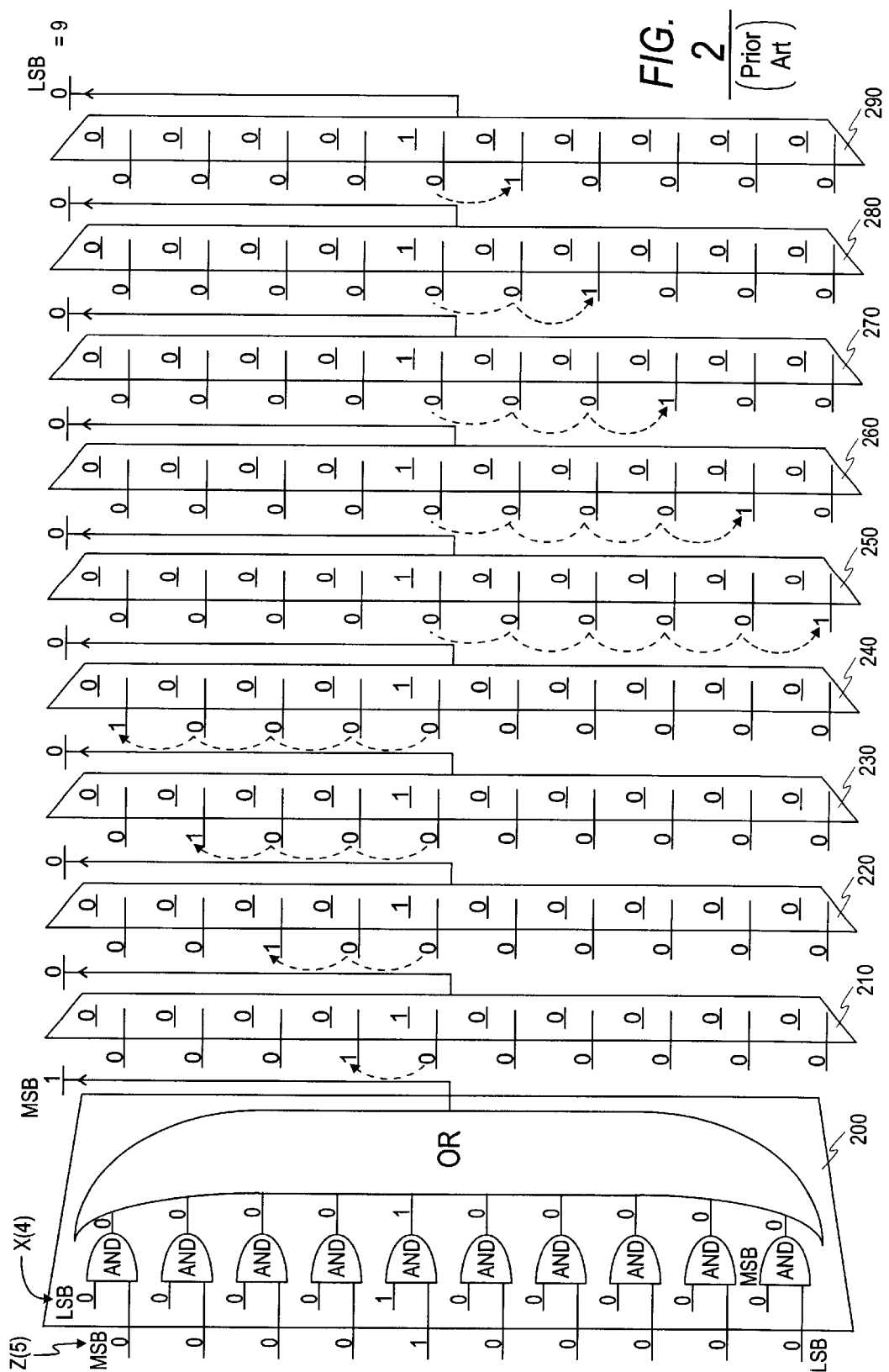
FIG. 2 illustrates another example of a conventional implementation of 10-bit decoded bit-vector addition using MUXes with 2-AND gates and a 10-OR that is 10 bits wide (ten 10-ORs in parallel, for example) in a second situation where overflow does not occur.
Figure 3:
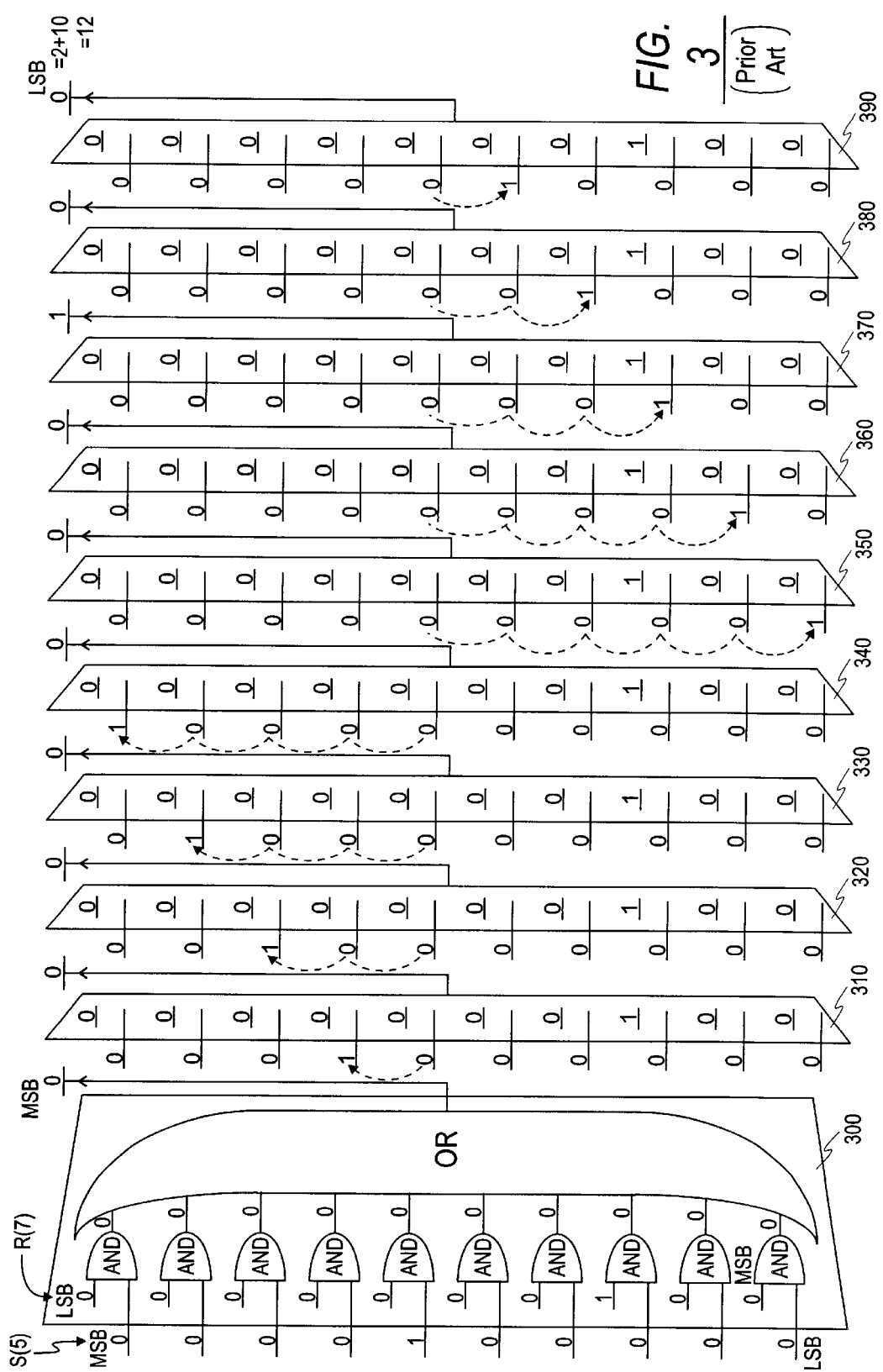
FIG. 3 illustrates an example of a conventional implementation of 10-bit decoded bit-vector addition using MUXes with 2-AND gates and a 10-OR that is 10 bits wide (ten 10-ORs in parallel, for example) in a first situation where overflow occurs.
Figure 4:
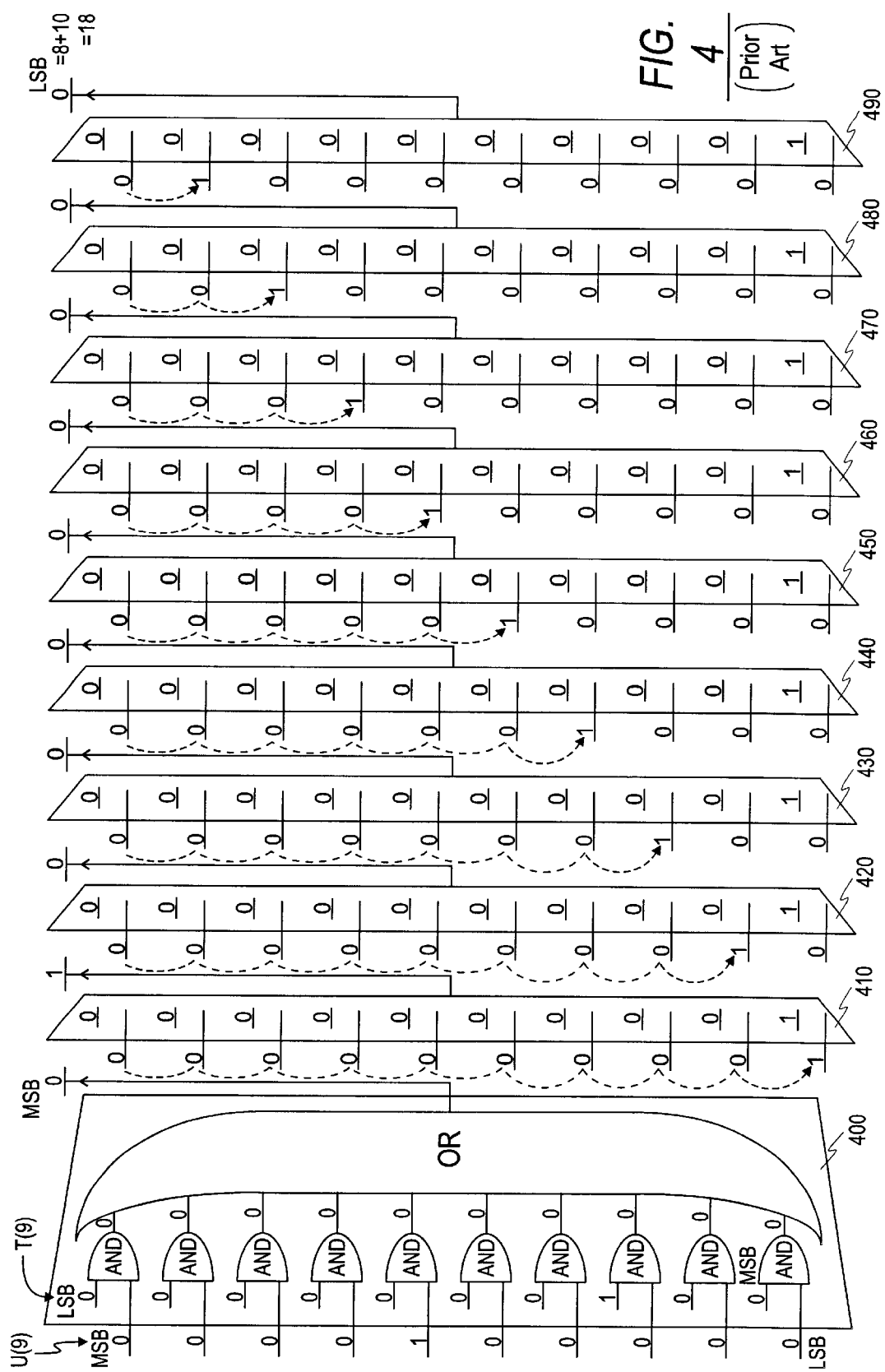
FIG. 4 illustrates another example of a conventional implementation of 10-bit decoded bit-vector addition using MUXes with 2-AND gates and a 10-OR that is 10 bits wide (ten 10-ORs in parallel, for example) in a second situation where overflow occurs.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

An (N+1)-bit decoded bit-vector $A = a_N a_{N-1} a_{N-2} a_{N-3} \ldots a_{k+1} a_k a_{k-1} \ldots a_3 a_2 a_1 a_0$ may be used to generate an (N+1)-bit one-ahead vector $O_A$ so that the i-th bit $O_A[i]$ of the (N+1)-bit one-ahead vector $O_A$ is given by $O_A[i]=OR(a_N, a_{N-1}, a_{N-2}, a_{N-3}, \ldots, a_{i+3}, a_{i+2}, a_{i+1})$ for $0<i<N-2$, $O_A[i]=a_N$ for $i=N-1$, and $O_A[i]=0$ for $i=N$. The (N+1)-bit one-ahead vector $O_A$ has ones (1's) corresponding to every zero (0) to the right of the 1 bit of the (N+1)-bit decoded bit-vector A and zeros (0's) otherwise. For example, if the number n is represented by $n=A=a_N a_{N-1} a_{N-2} \ldots a_{n+1} a_n a_{n-1} \ldots a_2 a_1 a_0$ where $A[k]=a_k=0$ for k n, and $A[n]=a_n=1$, then the corresponding one-ahead vector $O_A=h_N h_{N-1} h_{N-2} \ldots h_{n+1} h_n h_{n-1} \ldots h_2 h_1 h_0$ where $O_A[k]=h_k=0$ for $n \leq k \leq N$, and $O_A[k]=h_k=1$ for $0<k<n-1$.

In other words, the (N+1)-bit one-ahead vector $O_A$ (n), corresponding to the (N+1)-bit decoded bit-vector A (n) that represents the number n, has N+1−n 0's for the MSBs and n 1's for the LSBs. More particularly, for N=9, the 10-bit decoded bit-vector representing 4 is 0000010000 and the corresponding 10-bit one-ahead vector $O_A$ (4) is 0000001111, for example. Similarly, 10-bit decoded bit-vector representing 3 is 0000001000 and the corresponding 10-bit one-ahead vector $O_A$ (3) is 0000000111, for example.

As discussed above, OR(x, y, . . . , z) is the inclusive logical OR operation, and AND (r, s) is the logical AND operation. Where at most one of x, y, . . . , z is equal to 1, with all the rest of x, y, . . . ,z equal to 0, the output of OR(x, y, . . . ,z) is equivalent to the sum x+y+ . . . +z. Where r and s are each either 1 or 0, the output of AND(r, s) is equivalent to the product (rs).

Figure 5:
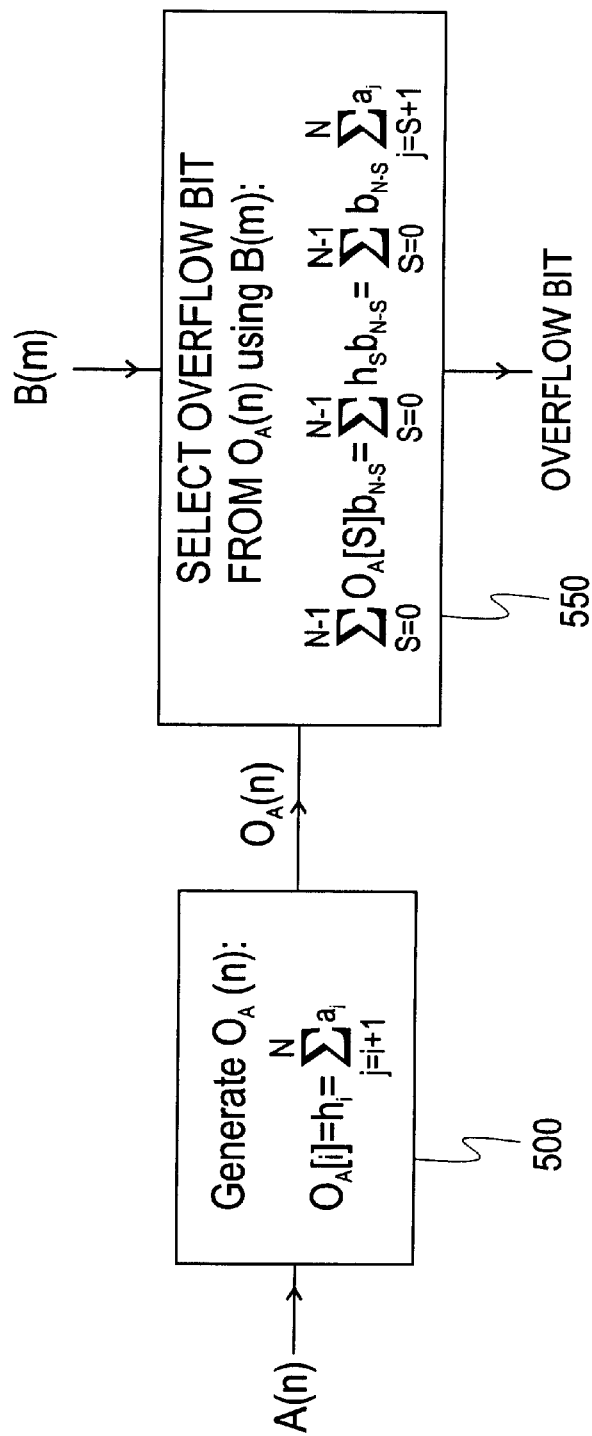
FIG. 5 illustrates schematically a method of overflow detection according to the present invention.

As shown in FIG. 5, overflow detection in the addition of two decoded bit-vectors A (n) and B (m) may be effected by generating a one-ahead vector $O_A$ (n) using the first decoded bit-vector A (n), as shown at 500, and selecting an overflow bit from the one-ahead vector $O_A$ (n) using the second decoded bit-vector B (m), as shown at 550. For example, in the addition of a first decoded bit-vector $A=a_N a_{N-1} a_{N-2} a_{N-3} \ldots a_{k+1} a_k a_{k-1} \ldots a_3 a_2 a_1 a_0$ (corresponding to n) to a second decoded bit-vector $B=b_N b_{N-1} b_{N-2} b_{N-3} \ldots b_{k+1} b_k b_{k-1} \ldots b_3 b_2 b_1 b_0$ (corresponding to m), the corresponding one-ahead vector is $O_A=h_N h_{N-1} h_{N-2} \ldots h_{n+1} h_n h_{n-1} \ldots h_2 h_1 h_0$ (where $O_A[k]=h_k=0$ for $n \leq k \leq N$, and $O_A[k]=h_k=1$ for $0 \leq k \leq n-1$) and the overflow bit may be selected to be $OR(AND(O_A[0],b_N), AND(O_A[1],b_{N-1}), \ldots, AND(O_A[N-1],b_1), AND(O_A[N],b_0))=OR(AND(h_0, b_N), AND(h_1, b_{N-1}), \ldots, AND(h_{N-1},b_1), AND(h_N, b_0))$.

Figure 6:
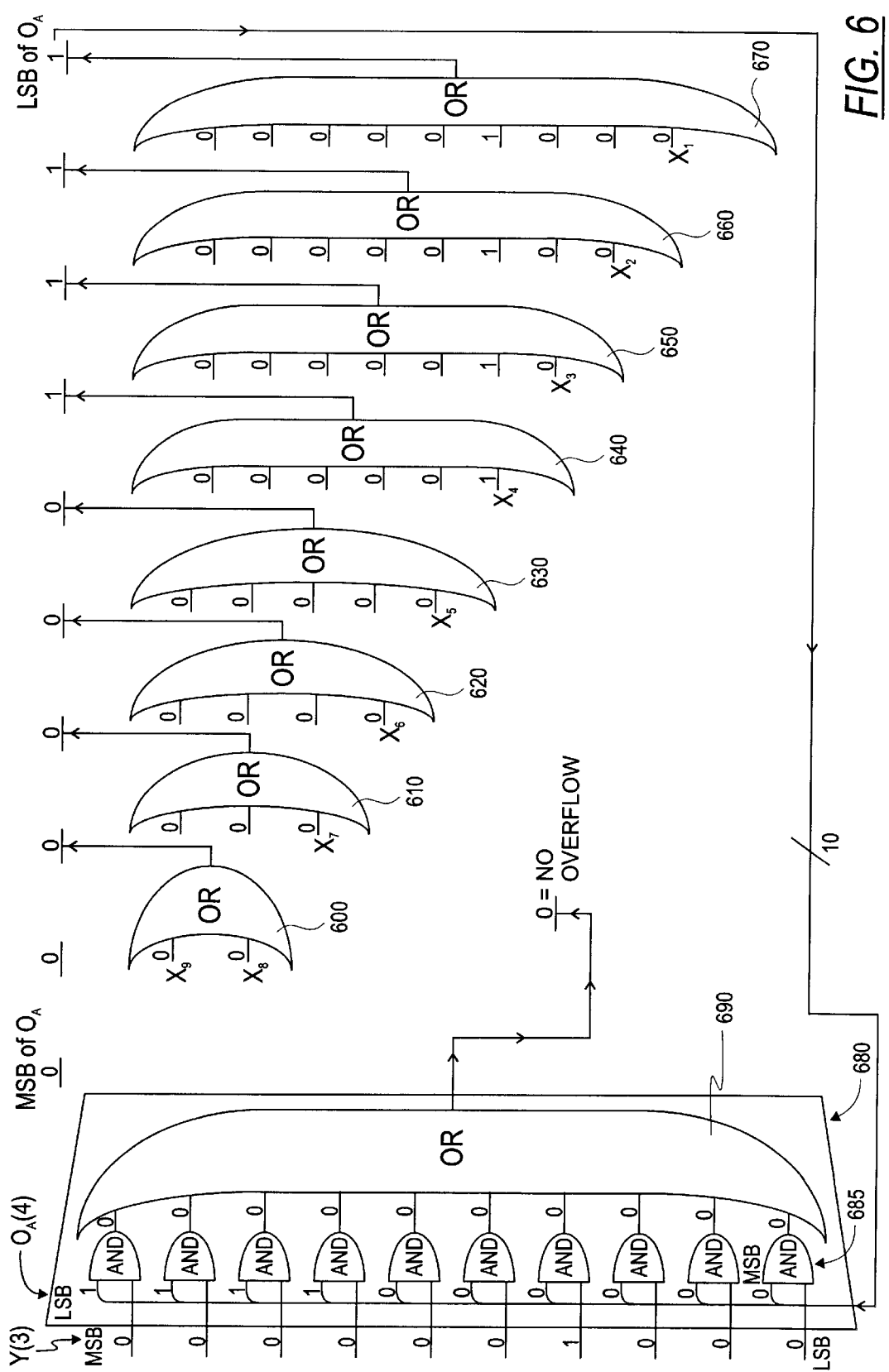
FIG. 6 illustrates an exemplary embodiment of an implementation of overflow detection according to the present invention using eight OR gates that are 1 bit wide, a MUX with ten 2-AND gates and a 10-OR gate that is 1 bit wide in a first situation where overflow does not occur.

FIG. 6 illustrates an exemplary embodiment of an implementation of overflow detection according to the present invention using eight OR gates that are 1 bit wide, a MUX with ten 2-AND gates and a 10-OR gate that is 1 bit wide. As shown in FIG. 6, bits from the first one of the two 10-bit decoded bit-vectors $X=x_9 x_8 x_7 x_6 x_5 x_4 x_3 x_2 x_1 x_0=0000010000$ (corresponding to 4) are input into eight OR gates in parallel. The MSB $O_A[9]$ of the one-ahead vector $O_A$ (4) corresponding to X (4) is always set equal to 0. The next to the MSB $O_A[8]$ of the one-ahead vector $O_A$ (4) is always set equal to the MSB $x_9=0$ of X (4). Then, $x_9$ and $x_8$ are input into the leftmost OR gate 600, whose output will be the third MSB $O_A[7]=OR(x_9, x_8)=OR(0,0)=0$ of the one-ahead vector $O_A$ (4). Similarly, $x_9, x_8$ and $x_7$ are input into OR gate 610, whose output will be the fourth MSB $O_A[6]=OR(x_9, x_8, x_7)$ so that $O_A[6]=OR(0,0,0)=0$, then $x_9, x_8, x_7$ and $x_6$ are input into OR gate 620, whose output will be the fifth MSB $O_A[5]=OR(x_9, x_8, x_7, x_6)$ so that $O_A[5]=OR(0,0,0,0)=0$, and $x_9, x_8, x_7, x_6$ and $x_5$ are input into OR gate 630, whose output will be the sixth MSB $O_A[4]=OR(x_9, x_8, x_7, x_6, x_5)$ so that $O_A[4]=OR(0,0,0,0,0)=0$.

Likewise, $x_9, x_8, x_7, x_6, x_5$ and $x_4$ are input into OR gate 640, whose output will be the fourth LSB $O_A[3]=OR(x_9, x_8,$ $x_7, x_6, x_5, x_4)$ so that $O_A[3]=OR(0,0,0,0,0,1)=1$, then $x_9, x_8, x_7, x_6, x_5, x_4$ and $x_3$ are input into OR gate 650, whose output will be the third LSB $O_A[2]=OR(x_9, x_8, x_7, x_6, x_5, x_4, x_3)$ so that $O_A[2]=OR(0,0,0,0,1,0)=1$, then $x_9, x_8, x_7, x_6, x_5, x_4,$ $x_3$ and $x_2$ are input into OR gate 660, whose output will be the second LSB $O_A[1]=OR(x_9, x_8, x_7, x_6, x_5, x_4, x_3, x_2)$ so that $O_A[1]=OR(0,0,0,0,1,0,0)=1$, and $x_9, x_8, x_7, x_6, x_5, x_4,$ $x_3, x_2$ and $x_1$ are input into OR gate 670, whose output will be the LSB $O_A[0]=OR(x_9, x_8, x_7, x_6, x_5, x_4, x_3, x_2, x_1)$ so that $O_A[0]=OR(0,0,0,0,0,1,0,0,0)=1$. As shown in FIG. 6, the one-ahead vector $O_A$ (4) corresponding to X (4) is $O_A=h_9 h_8 h_7 h_6 h_5 h_4 h_3 h_2 h_1 h_0=0000001111$.

As further shown in FIG. 6, the one-ahead vector $O_A$ (4) $h_9 h_8 h_7 h_6 h_5 h_4 h_3 h_2 h_1 h_0=0000001111$, corresponding to X (4), is input into a MUX 680, having ten 2-AND gates 685 and a 10-OR gate 690, with the LSB $h_0$ (1 here) at the top and the MSB $h_9$ (0 always) at the bottom. The second one of the two 10-bit decoded bit-vectors $Y=y_9 y_8 y_7 y_6 y_5 y_4 y_3 Y_2 y_1 y_0=0000001000$ (corresponding to 3) is input into MUX 680 with the MSB $y_9$ (0 here) at the top and with the LSB $y_0$ (0 here) at the bottom. Consequently, the LSB $h_0$ (1 here) of $O_A$ (4) is 2-ANDed with the MSB $y_9$ (0 here) of Y (3), the MSB $h_9$ (0 always) of $O_A$ (4) is 2-ANDed with the LSB $y_0$ (0 here) of Y (3) and all the respective intervening bits are similarly 2-ANDed together, as shown in FIG. 6.

Moreover, the output of the ten 2-AND gates 685 is then input into 10-OR gate 690 of MUX 680. The overflow bit may then be selected to be $OR(AND(O_A[0], y_9), AND(O_A[1], y_8), \ldots, AND(O_A[8], y_1), AND(O_A[9], y_0))=OR(AND(h_0, y_9), AND(h_1, y_8), \ldots, AND(h_8, y_1), AND(h_9, Y_0))=OR(AND(1, 0), AND(1, 0), AND(1, 0), AND(1, 0), AND(0, 0), AND(0, 0), AND(0, 1), AND(0, 0), AND(0, 0), AND(0, 0))=OR(0,0,0,0,0,0,0,0,0,0)=0$. This indicates no overflow.

Figure 7:
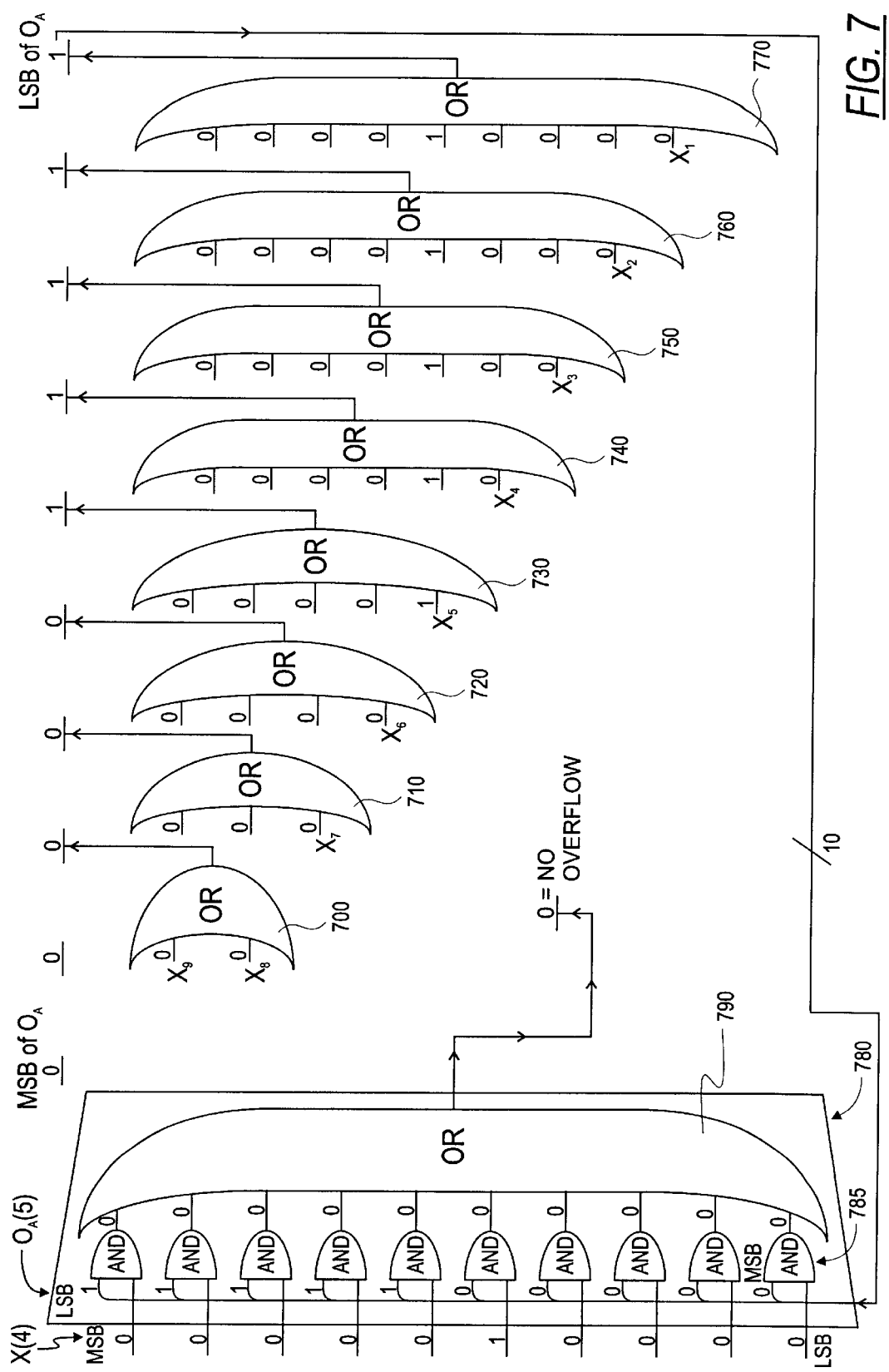
FIG. 7 illustrates another example of the exemplary embodiment of an implementation of overflow detection according to the present invention using eight OR gates that are 1 bit wide, a MUX with ten 2-AND gates and a 10-OR gate that is 1 bit wide in a second situation where overflow does not occur.

FIG. 7 illustrates another example of the exemplary embodiment of an implementation of overflow detection according to the present invention using eight OR gates that are 1 bit wide, a MUX with ten 2-AND gates and a 10-OR gate that is 1 bit wide. As shown in FIG. 7, bits from the first one of the two 10-bit decoded bit-vectors $Z=z_9 z_8 z_7 z_6 z_5 z_4 z_3 z_1 z_0=0000100000$ (corresponding to 5) are input into eight OR gates in parallel. The MSB $O_A[9]$ of the one-ahead vector $O_A$ (5) corresponding to Z (5) is always set equal to 0. The next to the MSB $O_A[8]$ of the one-ahead vector $O_A$ (5) is always set equal to the MSB $z_9=0$ of Z (5). Then, $z_9$ and $z_8$ are input into the leftmost OR gate 700, whose output will be the third MSB $O_A[7]=OR(z_9, z_8)=OR(0,0)=0$ of the one-ahead vector $O_A$ (5). Similarly, $z_9, z_8$ and $z_7$ are input into OR gate 710, whose output will be the fourth MSB $O_A[6]=OR(z_9, z_8, z_7)$ so that $O_A[6]32 OR(0,0,0)=0$, and $z_9, z_8, z_7$ and $z_6$ are input into OR gate 720, whose output will be the fifth MSB $O_A[5]=OR(z_9, z_8, z_7, z_6)$ so that $O_A[5]=OR(0,0,0,0)=0$.

Likewise, $z_9, z_8, z_7, z_6$ and $z_5$ are input into OR gate 730, whose output will be the sixth MSB $O_A[4]=OR(z_9, z_8, z_7, z_6, z_5)$ so that $O_A[4]=OR(0,0,0,0,1)=1$, then $z_9, z_8, z_7, z_6, z_5$ and $z_4$ are input into OR gate 740, whose output will be the fourth LSB $O_A[3]=OR(z_9, z_8, z_7, z_6, z_5, z_4)$ so that $O_A[3]=OR(0,0,0,0,1,0)=1$, then $z_9, z_8, z_7, z_6, z_5, z_4$ and $z_3$ are input into OR gate 750, whose output will be the third LSB $O_A[2]=OR(z_9, z_8, z_7, z_6, z_5, z_4, z_3)$ so that $O_A[2]=OR(0,0, 0,0,1,0,0)=1$, then $z_9, z_8, z_7, z_6, z_5, z_4, z_3$ and $z_2$ are input into OR gate 760, whose output will be the second LSB $O_A[1]=OR(z_9, z_8, z_7, z_6, z_5, z_4, z_3, z_2)$ so that $O_A[1]=OR(0,0,0,0, 1,0,0,0)=1$, and $z_9, z_8, z_7, z_6, z_5, z_4, z_3, z_2$ and $z_1$ are input into OR gate 770, whose output will be the LSB $O_A[0]=OR(x_9, x_8, x_7, x_6, x_5, x_4, x_3, x_2, x_1)$ so that $O_A[0]=OR(0,0,0,0,$ 1,0,0,0,0)=1. As shown in FIG. 7, the one-ahead vector $O_A$ (5) corresponding to Z (5) is $O_A=h_9h_8h_7h_6h_5h_4h_3h_2h_1h_0=$ 0000011111.

As further shown in FIG. 7, the one-ahead vector $O_A$ (5) $h_9h_8h_7h_6h_5h_4h_3h_2h_1h_0=$0000011111, corresponding to Z (5), is input into a MUX 780, having ten 2-AND gates 785 and a 10-OR gate 790, with the LSB $h_0$ (1 here) at the top and the MSB $h_9$ (0 always) at the bottom. The second one of the two 10-bit decoded bit-vectors $X=x_9x_8x_7x_6x_5x_4x_3x_2x_1x_0=$ 0000010000 (corresponding to 4) is input into MUX 780 with the MSB $x_9$ (0 here) at the top and with the LSB $x_0$ (0 here) at the bottom. Consequently, the LSB $h_0$ (1 here) of $O_A$ (5) is 2-ANDed with the MSB $x_9$ (0 here) of X (4), the MSB $h_9$ (0 always) of $O_A$ (5) is 2-ANDed with the LSB $x_0$ (0 here) of X (4) and all the respective intervening bits are similarly 2-ANDed together, as shown in FIG. 7.

Moreover, the output of the ten 2-AND gates 785 is then input into 10-OR gate 790 of MUX 780. The overflow bit may then be selected to be OR(AND($O_A$[0], $x_9$), AND($O_A$[1], $x_8$), ..., AND($O_A$[8], $x_1$), AND($O_A$[9], $x_0$))=OR(AND ($h_0$, $x_9$), AND($h_1$, $x_8$), ..., AND($h_8$, $x_1$), AND($h_9$, $x_0$))= OR(AND(1, 0), AND(1, 0), AND(1, 0), AND(1, 0), AND(1, 0), AND(0, 1), AND(0, 0), AND(0, 0), AND(0, 0), AND(0, 0))=OR(0,0,0,0,0,0,0,0,0,0)=0. This again indicates no overflow.

Figure 8:
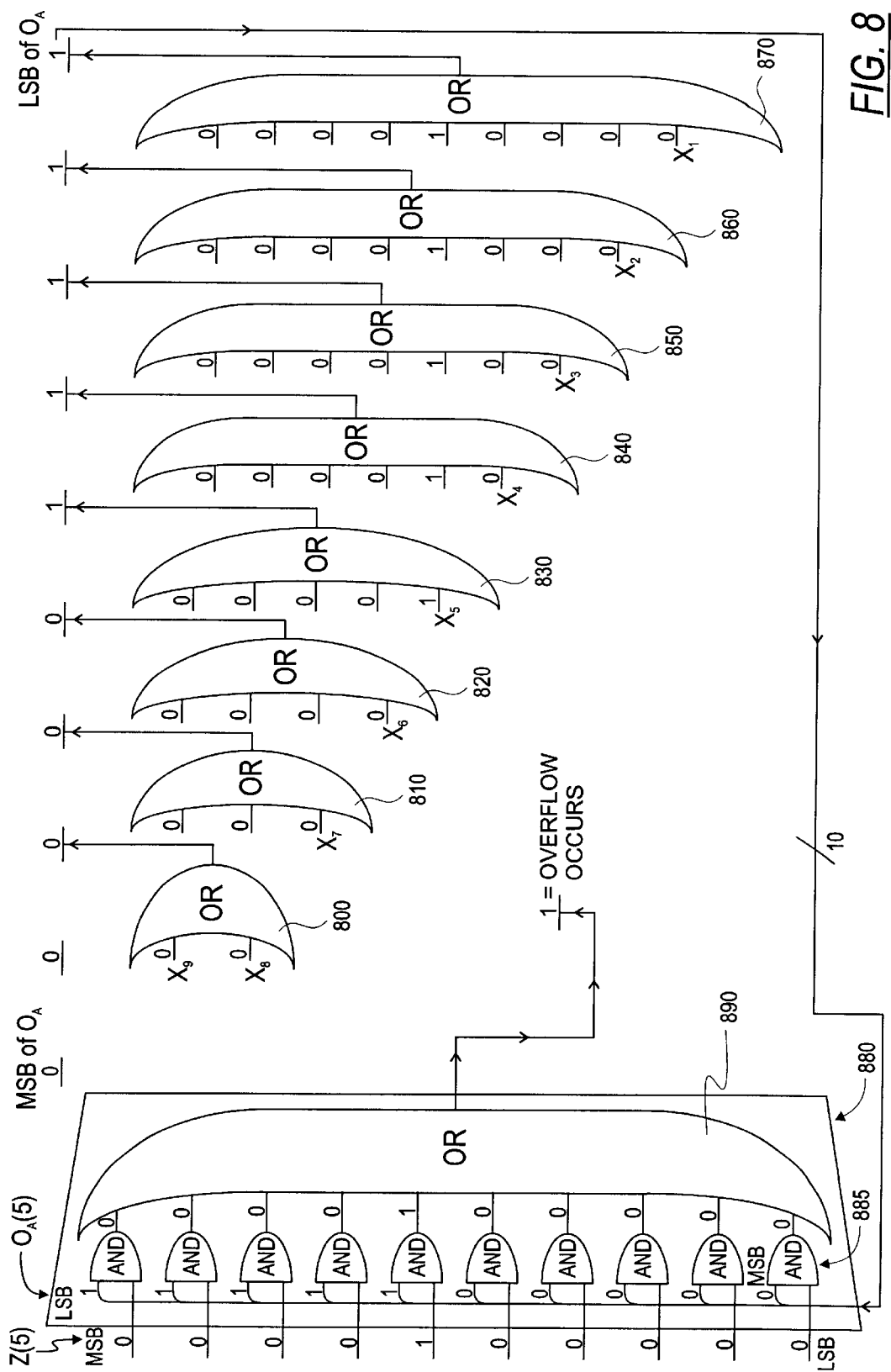
FIG. 8 illustrates yet another example of the exemplary embodiment of an implementation of overflow detection according to the present invention in a first situation where overflow occurs, again using eight OR gates that are 1 bit wide, a MUX with ten 2-AND gates and a 10-OR gate that is 1 bit wide.

FIG. 8 illustrates yet another example of the exemplary embodiment of an implementation of overflow detection according to the present invention in a case where overflow occurs, again using eight OR gates that are 1 bit wide, a MUX with ten 2-AND gates and a 10-OR gate that is 1 bit wide. As shown in FIG. 8, bits from the first one of the two 10-bit decoded bit-vectors $Z=z_9z_8z_7z_6z_5z_4z_3z_2z_1z_0=$ 0000100000 (corresponding to 5) are input into eight OR gates in parallel. The MSB $O_A$[9] of the one-ahead vector $O_A$ (5) corresponding to Z (5) is always set equal to 0. The next to the MSB $O_A$[8] of the one-ahead vector $O_A$ (5) is always set equal to the MSB $z_9$=0 of Z (5). Then, $z_9$ and $z_8$ are input into the leftmost OR gate 800, whose output will be the third MSB $O_A$[7]=OR($z_9$, $z_8$)=OR(0,0)=0 of the one-ahead vector $O_A$ (5). Similarly, $z_9$, $z_8$ and $z_7$ are input into OR gate 810, whose output will be the fourth MSB $O_A$[6]=OR($z_9$, $z_8$, $z_7$) so that $O_A$[6]=OR(0,0,0)=0, and $z_9$, $z_8$, $z_7$ and $z_6$ are input into OR gate 820, whose output will be the fifth MSB $O_A$[5]=OR($z_9$, $z_8$, $z_7$, $z_6$) so that $O_A$[5]=OR(0, 0, 0, 0)=0.

Likewise, $z_9$, $z_8$, $z_7$, $z_6$ and $z_5$ are input into OR gate 830, whose output will be the sixth MSB $O_A$[4]=OR($z_9$, $z_8$, $z_7$, $z_6$, $z_5$) so that $O_A$[4]=OR(0,0,0,0,1)=1, then $z_9$, $z_8$, $z_7$, $z_6$, $z_5$ and $z_4$ are input into OR gate 840, whose output will be the fourth LSB $O_A$[3]=OR($z_9$, $z_8$, $z_7$, $z_6$, $z_5$, $z_4$) so that $O_A$[3]= OR(0,0,0,0,1,0)=1, then $x_9$, $x_8$, $x_7$, $x_6$, $x_5$, $x_4$ and $x_3$ are input into OR gate 850, whose output will be the third LSB $O_A$[2]=OR($z_9$, $z_8$, $z_7$, $z_6$, $z_5$, $z_4$, $z_3$) so that $O_A$[2]=OR(0,0, 0,0,1,0,0)=1, then $z_9$, $z_8$, $z_7$, $z_6$, $z_5$, $z_4$, $z_3$ and $z_2$ are input into OR gate 860, whose output will be the second LSB $O_A$[1]= OR($z_9$, $z_8$, $z_7$, $z_6$, $z_5$, $z_4$, $z_3$, $z_2$) so that $O_A$[1]=OR(0,0,0,0, 1,0,0,0)=1, and $z_9$, $z_8$, $z_7$, $z_6$, $z_5$, $z_4$, $z_3$, $z_2$ and $z_1$ are input into OR gate 870, whose output will be the LSB $O_A$[0]=OR ($x_9$, $x_8$, $x_7$, $x_6$, $x_5$, $x_4$, $x_3$, $x_2$, $x_1$) so that $O_A$[0]=OR(0,0,0,0, 1,0,0,0,0)=1. As shown in FIG. 8, the one-ahead vector $O_A$ (5) corresponding to Z (5) is $O_A=h_9h_8h_7h_6h_5h_4h_3h_2h_1h_0=$ 0000011111.

As further shown in FIG. 8, the one-ahead vector $O_A$ (5) $h_9h_8h_7h_6h_5h_4h_3h_2h_1h_0=$0000011111, corresponding to Z (5), is input into a MUX 880, having ten 2-AND gates 885 and a 10-OR gate 890, with the LSB $h_0$ (1 here) at the top and the MSB $h_9$ (0 always) at the bottom. The second one of the two 10-bit decoded bit-vectors $Z=z_9z_8z_7z_6z_5z_4z_3z_2z_1z_0=$ 0000100000 (corresponding to 5) is input into MUX 880 with the MSB $z_9$ (0 here) at the top and with the LSB $z_0$ (0 here) at the bottom. Consequently, the LSB $h_0$ (1 here) of $O_A$ (5) is 2-ANDed with the MSB $z_9$ (0 here) of Z (5), the MSB $h_9$ (0 always) of $O_A$ (5) is 2-ANDed with the LSB $z_0$ (0 here) of Z (5) and all the respective intervening bits are similarly 2-ANDed together, as shown in FIG. 8.

Moreover, the output of the ten 2-AND gates 885 is then input into 10-OR gate 890 of MUX 880. The overflow bit may then be selected to be OR(AND($O_A$[0], $z_9$), AND($O_A$[1], $z_8$), ..., AND($O_A$[8], $z_1$), AND($O_A$[9], $z_0$))=OR(AND ($h_0$, $z_9$), AND($h_1$, $z_8$), ..., AND($h_8$, $z_1$), AND($h_9$, $z_0$))=OR (AND(1, 0), AND(1, 0), AND(1, 0), AND(1, 0), AND(1, 1), AND(0, 0), AND(0, 0), AND(0, 0), AND(0, 0), AND(0, 0))=OR(0,0,0,0,1,0,0,0,0,0)=1. This indicates an overflow.

Figure 9:
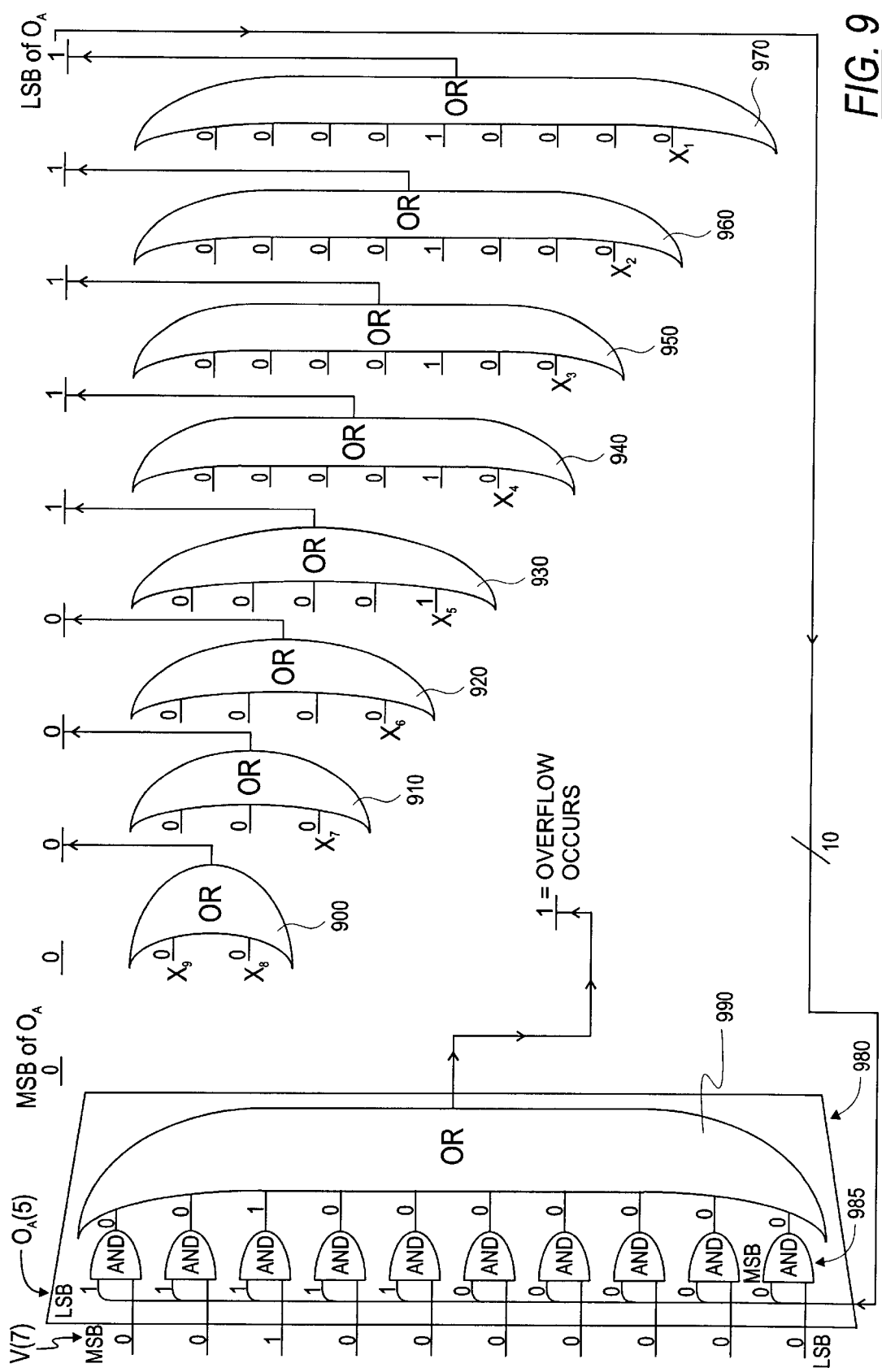
FIG. 9 illustrates yet another example of the exemplary embodiment of an implementation of overflow detection according to the present invention in a second situation where overflow occurs.

FIG. 9 illustrates yet another example of the exemplary embodiment of an implementation of overflow detection according to the present invention in a case where overflow occurs. As shown in FIG. 9, bits from the first one of the two 10-bit decoded bit-vectors $Z=z_9z_8z_7z_6z_5z_4z_3z_2z_1z_0=$ 0000100000 (corresponding to 5) are input into eight OR gates in parallel. The MSB $O_A$[9] of the one-ahead vector $O_A$ (5) corresponding to Z (5) is always set equal to 0. The next to the MSB $O_A$[8] of the one-ahead vector $O_A$ (5) is always set equal to the MSB $z_9$=0 of Z (5). Then, $z_9$ and $z_8$ are input into the leftmost OR gate 900, whose output will be the third MSB $O_A$[7]=OR($z_9$, $z_8$)=OR(0, 0)=0 of the one-ahead vector $O_A$ (5). Similarly, $z_9$, $z_8$ and $z_7$ are input into OR gate 910, whose output will be the fourth MSB $O_A$[6]=OR($z_9$, $z_8$, $z_7$) so that $O_A$[6]=OR(0, 0, 0)=0, and $z_9$, $z_8$, $z_7$ and $z_6$ are input into OR gate 920, whose output will be the fifth MSB $O_A$[5]=OR($z_9$, $z_8$, $z_7$, $z_6$) so that $O_A$[5]=OR(0,0,0,0)=0.

Likewise, $z_9$, $z_8$, $z_7$, $z_6$ and $z_5$ are input into OR gate 930, whose output will be the sixth MSB $O_A$[4]=OR($z_9$, $z_8$, $z_7$, $z_6$, $z_5$) so that $O_A$[4]=OR(0,0,0,0,1)=1, then $z_9$, $z_8$, $z_7$, $z_6$, $z_5$ and $z_4$ are input into OR gate 940, whose output will be the fourth LSB $O_A$[3]=OR($z_9$, $z_8$, $z_7$, $z_6$, $z_5$, $z_4$) so that $O_A$[3]= OR(0,0,0,0,1,0)=1, then $x_9$, $x_8$, $x_7$, $x_6$, $x_5$, $x_4$ and $x_3$ are input into OR gate 950, whose output will be the third LSB $O_A$[2]=OR($z_9$, $z_8$, $z_7$, $z_6$, $z_5$, $z_4$, $z_3$) so that $O_A$[2]=OR(0,0, 0,0,1,0,0)=1, then $z_9$, $z_8$, $z_7$, $z_6$, $z_5$, $z_4$, $z_3$ and $z_2$ are input into OR gate 960, whose output will be the second LSB $O_A$[1]= OR($z_9$, $z_8$, $z_7$, $z_6$, $z_5$, $z_4$, $z_3$, $z_2$) so that $O_A$[1]=OR(0,0,0,0, 1,0,0,0)=1, and $z_9$, $z_8$, $z_7$, $z_6$, $z_5$, $z_4$, $z_3$, $z_2$ and $z_1$ are input into OR gate 970, whose output will be the LSB $O_A$[0]=OR ($x_9$, $x_8$, $x_7$, $x_6$, $x_5$, $x_4$, $x_3$, $x_2$, $x_1$) so that $O_A$[0]=OR(0,0,0,0, 1,0,0,0,0)=1. As shown in FIG. 9, the one-ahead vector $O_A$ (5) corresponding to Z (5) is $O_A=h_9h_8h_7h_6h_5h_4h_3h_2h_1h_0=$ 0000011111.

As further shown in FIG. 9, the one-ahead vector $O_A$ (5) $h_9h_8h_7h_6h_5h_4h_3h_2h_1h_0=$0000011111, corresponding to Z (5), is input into a MUX 980, having ten 2-AND gates 985 and a 10-OR gate 990, with the LSB $h_0$ (1 here) at the top and the MSB $h_9$ (0 always) at the bottom. The second one of the two 10-bit decoded bit-vectors $V=v_9v_8v_7v_6v_5v_4v_3v_2v_1v_0=$ 0010000000 (corresponding to 7) is input into MUX 980 with the MSB $v_9$ (0 here) at the top and with the LSB $v_0$ (0 here) at the bottom. Consequently, the LSB $h_0$ (1 here) of $O_A$ (5) is 2-ANDed with the MSB $v_9$ (0 here) of V (7), the MSB $h_9$ (0 always) of $O_A$ (5) is 2-ANDed with the LSB $v_0$ (0 here) of V (7) and all the respective intervening bits are similarly 2-ANDed together, as shown in FIG. 9.

Moreover, the output of the ten 2-AND gates 985 is then input into 10-OR gate 990 of MUX 980. The overflow bit may then be selected to be OR(AND($O_A$[0], $v_9$), AND($O_A$

[1], v$_8$), . . . AND(O$_A$[8], v$_1$), AND(O$_A$[9], v$_0$))=OR(AND (h$_0$, v$_9$), AND(h$_1$, v$_8$), . . . , AND(h$_8$, v$_1$), AND(h$_9$, v$_0$))= OR(AND(1, 0), AND(1, 0), AND(1, 1), AND(1, 0), AND(1, 0), AND(0, 0), AND(0, 0), AND(0, 0), AND(0, 0), AND(0, 0))=OR(0,0,1,0,0,0,0,0,0,0)=1. This again indicates an overflow.

Figure 10:
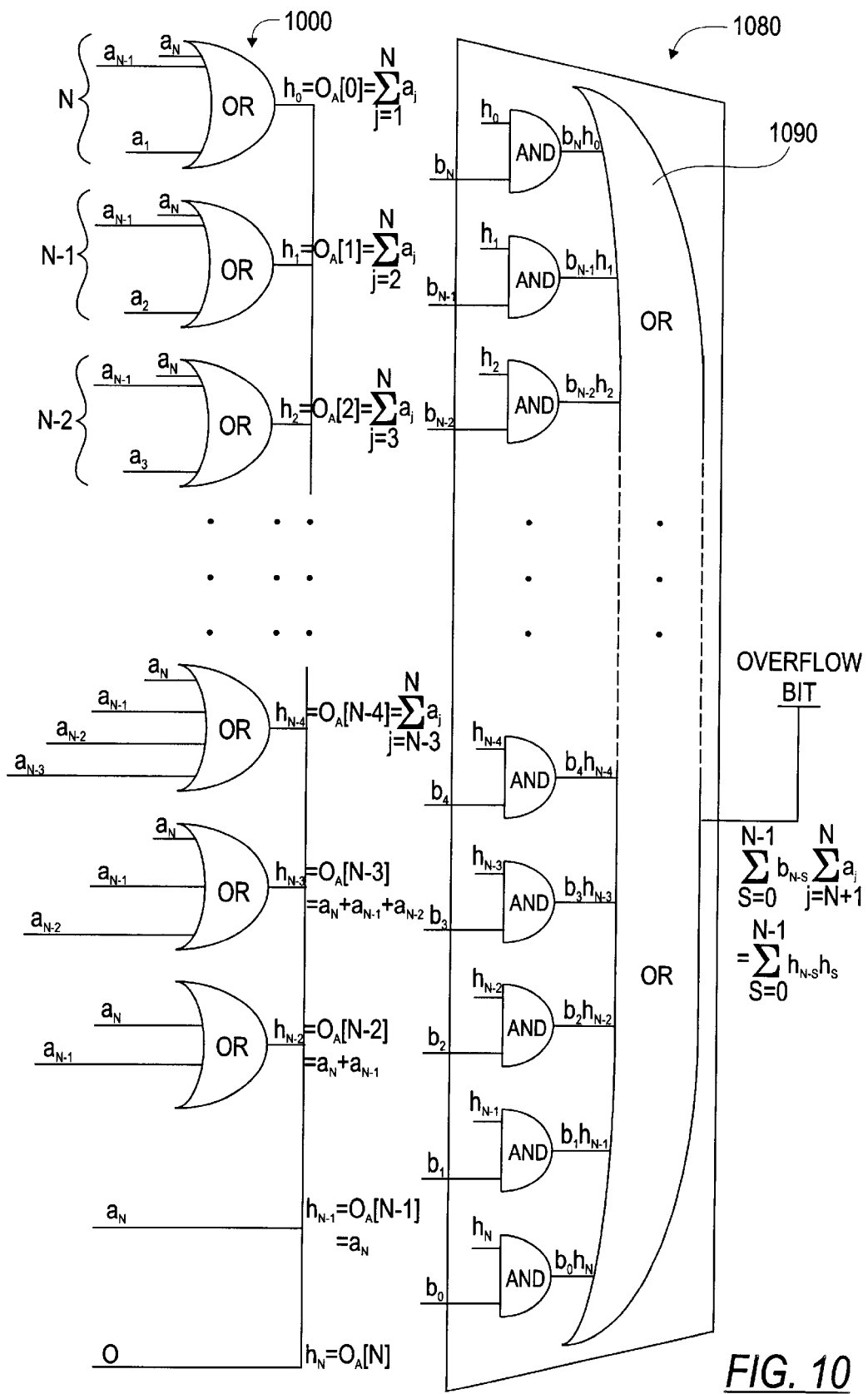
FIG. 10 illustrates an exemplary embodiment of an implementation of overflow detection according to the present invention using (N−1) N-OR gates that are 1 bit wide, a MUX with (N+1) 2-AND gates and an (N+1)-OR gate that is 1 bit wide.

When two (N+1)-bit decoded bit-vectors A=a$_N$a$_{N-1}$a$_{N-2}$a$_{N-3}$ . . . a$_{n+1}$a$_n$a$_{n-1}$ . . . a$_3$a$_2$a$_1$a$_0$ (corresponding to n, so that a$_n$=1 and a$_i$=0 for i n) and B=b$_N$b$_{N-1}$b$_{N-2}$b$_{N-3}$ . . . b$_{m+1}$b$_m$b$_{m-1}$ . . . b$_3$b$_2$b$_1$b$_0$ (corresponding to m, so that b$_m$=1 and b$_i$=0 for i m) are to be added together, as shown in FIG. 10, bits from the first of the two (N+1)-bit decoded bit-vectors to arrive, A (n) for example, may be input into N−1 N-OR gates 1000, similar to the eight OR gates 600–670 of FIG. 6, 700–770 of FIG. 7, 800–870 of FIG. 8 and 900–970 of FIG. 9. The outputs of the N−1 N-OR gates 1000 may be used to generate the N+1 bits of the one-ahead vector O$_A$ so that the i-th bit O$_A$[i] of the (N+1)-bit one-ahead vector O$_A$ is given by O$_A$[i]=OR (a$_N$,a$_{N-1}$,a$_{N-2}$,a$_{N-3}$, . . . ,a$_{i+3}$,a$_{i+2}$,a$_{i+1}$) for 0≤i≤N−2, O$_A$[i]= a$_N$ for i=N−1, and O$_A$[i]=0 for i=N.

The bits from the one-ahead vector O$_A$=h$_N$h$_{N-1}$h$_{N-2}$ . . . h$_{n+1}$h$_n$h$_{n-1}$ . . . h$_2$h$_1$h$_0$ corresponding to the earlier arriving decoded bit-vector A (n), where O$_A$[k]=h$_k$=0 for n≤k≤N, and O$_A$[k]=h$_k$=1 for 0≤k≤n−1, may then be input into a MUX 1080, having N+1 2-AND gates 1085 and an (N+1)-OR gate 1090, similar to MUXes 680 of FIG. 6, 780 of FIG. 7, 880 of FIG. 8 and 980 of FIG. 9, with the LSB h$_0$ at the top and the MSB h$_N$ (0 always) at the bottom. The second decoded bit-vector B=b$_N$b$_{N-1}$b$_{N-2}$b$_{N-3}$ . . . b$_{k+1}$b$_k$b$_{k-1}$ . . . b$_3$b$_2$b$_1$b$_0$ (corresponding to m), may then be input into MUX 1080 that O$_A$ (n) was input into, with the MSB b$_N$ at the top and with the LSB b$_0$ at the bottom. Consequently, the LSB h$_0$ of O$_A$ (n) is 2-ANDed with the MSB b$_N$ of B (m), the MSB h$_N$ (0 always) of O$_A$ (n) is 2-ANDed with the LSB b$_0$ of B (m) and all the respective intervening bits are similarly 2-ANDed together.

Moreover, the output of the N+1 2-AND gates 1085 that O$_A$ (n) and B (m) were input into may then be input into the (N+1)-OR gate 1090 of MUX 1080, similar to the 10-OR gates 690 of FIG. 6, 790 of FIG. 7, 890 of FIG. 8 and 990 of FIG. 9, and the overflow bit may then be selected to be OR(AND(O$_A$[0], b$_N$), AND(O$_A$[1], b$_{N-1}$), . . . , AND(O$_A$ [N−1], b$_1$), AND(O$_A$[N], b$_0$))=OR(AND(h$_0$, b$_N$), AND(h$_1$, b$_{N-1}$), . . . , AND(h$_{N-1}$,b$_1$), AND(h$_N$, b$_0$)). An overflow bit of 0 indicates no overflow and an overflow bit of 1 indicates an overflow.

In particular, when one of the two (N+1)-bit decoded bit-vectors A=a$_N$a$_{N-1}$a$_{N-2}$a$_{N-3}$ . . . a$_{n+1}$a$_n$a$_{n-1}$ . . . a$_3$a$_2$a$_1$a$_0$ corresponds to n=0, so that a$_0$=1 and a$_i$=0 for i=1, 2, . . . , N, and B=b$_N$b$_{N-1}$b$_{N-2}$b$_{N-3}$ . . . b$_{m+1}$b$_m$b$_{m-1}$ . . . b$_3$b$_2$b$_1$b$_0$ corresponds to m, so that b$_m$=1 and b$_i$=0 for i m, then adding A+B always yields a number 0+m=m that is less than or equal to N. When bits from the first of the two (N+1)-bit decoded bit-vectors to arrive, assumed to be A (0) in this example, are input into N−1 N-OR gates 1000 to generate the N+1 bits of the one-ahead vector O$_A$, all bits O$_A$[i] of the (N+1)-bit one-ahead vector O$_A$ are given by O$_A$[i]=OR(a$_N$, a$_{N-1}$, a$_{N-2}$, a$_{N-3}$, . . . ,a$_{i+3}$, a$_{i+2}$, a$_{i+1}$)=0 for 0≤i≤N−2, O$_A$[i]=a$_N$=0 for i=N−1, and O$_A$[i]=0 for i=N, since a$_0$=1 and a$_i$=0 for i=1, 2, . . . , N.

The bits from the one-ahead vector O$_A$=h$_N$h$_{N-1}$h$_{N-2}$ . . . h$_{n+1}$h$_n$h$_{n-1}$ . . . h$_2$h$_1$h$_0$ corresponding to the earlier arriving decoded bit-vector A (0), where O$_A$[k]=h$_k$=0 for 0≤k≤N, may then be input into MUX 1080, with the LSB h$_0$ (0 here) at the top and the MSB h$_N$ (0 always) at the bottom. The second decoded bit-vector B=b$_N$b$_{N-1}$b$_{N-2}$b$_{N-3}$ . . . b$_{k+1}$b$_k$b$_{k-1}$ . . . b$_3$b$_2$b$_1$b$_0$ (corresponding to m), may then be input into MUX 1080 that O$_A$ (0) was input into, with the MSB b$_N$ at the top and with the LSB b$_0$ at the bottom. Consequently, the LSB h$_0$ (0 here) of O$_A$ (0) is 2-ANDed with the MSB b$_N$ of B (m), the MSB h$_N$ (0 always) of O$_A$ (0) is 2-ANDed with the LSB b$_0$ of B (m) and all the respective intervening bits are similarly 2-ANDed together. In this case, the N+1 2-ANDs 1085 all yield 0's, since O$_A$[k]=h$_k$=0 for 0≤k≤N.

Moreover, the output of the N+1 2-AND gates 1085 that O$_A$ (0) and B (m) were input into may then be input into the (N+1)-OR gate 1090 of MUX 1080. The overflow bit may then be selected to be OR(AND(O$_A$[0], b$_N$), AND(O$_A$[1], b$_{N-1}$), . . . , AND(O$_A$[N−1], b$_1$), AND(O$_A$[N], b$_0$))=OR (AND(h$_0$, b$_N$), AND(h$_1$, b$_{N-1}$), . . . , AND(h$_{N-1}$, b$_1$), AND (h$_N$, b$_0$))=OR(AND(0, b$_N$), AND(0, b$_{N-1}$), . . . ,AND(0, b$_1$), AND(0, b$_0$))=0, since O$_A$[k]=h$_k$=0 for 0≤k≤N, indicating no overflow, as expected.

Taking another particular example, when one of the two (N+1)-bit decoded bit-vectors A=a$_N$a$_{N-1}$a$_{N-2}$a$_{N-3}$ . . . a$_{n+1}$a$_n$a$_{n-1}$ . . . a$_3$a$_2$a$_1$a$_0$ corresponds to n=N, so that a$_N$=1 and a$_i$=0 for i=0, 1, 2, . . . , N−1, and B=b$_N$b$_{N-1}$b$_{N-2}$b$_{N-3}$ . . . b$_{m+1}$b$_m$b$_{m-1}$ . . . b$_3$b$_2$b$_1$b$_0$ corresponds to m>0, so that b$_0$=0, then adding A+B always yields a number N+m that is greater than N. When bits from the first of the two (N+1)-bit decoded bit-vectors to arrive, assumed to be A (N) in this example, are input into N−1 N-OR gates 1000 to generate the N+1 bits of the one-ahead vector O$_A$, then the N LSBs O$_A$[i] for 0≤i≤N−1 of the (N+1)-bit one-ahead vector O$_A$ are given by O$_A$[i]=OR(a$_N$, a$_{N-1}$, a$_{N-2}$, a$_{N-3}$, . . . , a$_{i+3}$, a$_{i+2}$, a$_{i+1}$)=1 for 0≤i≤N−2, O$_A$[i]=a$_N$=1 for i=N−1, and O$_A$[i]=0 for i=N, since a$_N$=1 and a$_i$=0 for i=0, 1, 2, . . . , N−1.

The bits from the one-ahead vector O$_A$=h$_N$h$_{N-1}$h$_{N-2}$ . . . h$_{n+1}$h$_n$h$_{n-1}$ . . . h$_2$h$_1$h$_0$ corresponding to the earlier arriving decoded bit-vector A (N), where O$_A$[k]=h$_k$=1 for 0≤k≤N−1 and O$_A$[N]=h$_N$=0 always, may then be input into MUX 1080, with the LSB h$_0$ (1 here) at the top and the MSB h$_N$ (0 always) at the bottom. The second decoded bit-vector B=b$_N$b$_{N-1}$b$_{N-2}$b$_{N-3}$ . . . b$_{k+1}$b$_k$b$_{k-1}$ . . . b$_3$b$_2$b$_1$b$_0$ (corresponding to m>0), may then be input into MUX 1080 that O$_A$ (N) was input into, with the MSB b$_N$ at the top and with the LSB b$_0$ (0 here) at the bottom. Consequently, the LSB h$_0$ (1 here) of O$_A$ (N) is 2-ANDed with the MSB b$_N$ of B (m>0), the MSB h$_N$ (0 always) of O$_A$ (N) is 2-ANDed with the LSB b$_0$ (0 here) of B (m>0) and all the respective intervening bits are similarly 2-ANDed together. In this case, one of the N+1 2-ANDs 1085 must yield a 1, since O$_A$[k]=h$_k$=1 for 0≤k≤N−1 and b$_0$=0 so that b$_m$=1 for 1≤m≤N.

Moreover, the output of the N+1 2-AND gates 1085 that O$_A$ (N) and B (m>0) were input into may then be input into the (N+1)-OR gate 1090 of MUX 1080. The overflow bit may then be selected to be OR(AND(O$_A$[0], b$_N$), AND(O$_A$ [1], b$_{N-1}$), . . . , AND(O$_A$[N−1], b$_1$), AND(O$_A$[N], b$_0$))=OR (AND(h$_0$, b$_N$), AND(h$_1$, b$_{N-1}$), . . . , AND(h$_{N-1}$, b$_1$), AND (h$_N$, b$_0$))=OR(AND(1, b$_N$), AND(1, b$_{N-1}$), . . . ,AND(1, b$_1$), AND(0, 0))=b$_m$=1 for 1≤m≤N, since O$_A$[k]=h$_k$=1 for 0≤k≤N−1 and b$_0$=0, indicating an overflow, as expected.

The time delay for exemplary embodiments of implementations of overflow detection according to the present invention, including using one of two (N+1)-bit decoded bit-vectors input into N−1 N-OR gates to generate an (N+1)-bit one-ahead vector and then using a MUX having N+1 2-AND gates and an (N+1)-OR gate to detect an overflow by selecting an overflow bit from bits of the (N+1)-bit one-ahead vector using the second of two (N+1)- bit decoded bit-vectors, may be estimated as follows. The time $t_{2-AND}$ for using a MUX having N+1 2-AND gates may be added to the time $t_{N-OR}$[(N−1)-bits wide] for using the N−1 N-ORs in parallel and to the time $t_{(N+1)-OR}$[1-bit wide] for using the one (N+1)-OR, giving the time $t_{new-simultaneous} = t_{2-AND} + t_{N-OR}$[(N−1)-bits wide]+$t_{(N+1)-OR}$[1-bit wide].

This may be compared with the time $t_{conventional-simultaneous} = t_{2-AND} + t_{(N+1)-OR}$[(N+1)-bits wide]+$t_{N-OR}$[1-bit wide]. The time $t_{new-simultaneous} = t_{2-AND} + t_{N-OR}$[(N−1)-bits wide]+$t_{(N+1)-OR}$[1-bit wide] is less than the time $t_{conventional-simultaneous} = t_{2-AND} + t_{(N+1)-OR}$[(N+1)-bits wide]+$t_{N-OR}$[1-bit wide]. The time $t_{conventional-simultaneous}$ includes the time $t_{(N+1)-OR}$[(N+1)-bits wide], for using the N+1 (N+1)-ORs in parallel, which is greater than the time $t_{N-OR}$[(N−1)-bits wide], for using the N−1 N-ORs in parallel, included in the time $t_{new-simultaneous}$. The times $t_{(N+1)-OR}$[1-bit wide] (included in the time $t_{new-simultaneous}$) and $t_{N-OR}$[1-bit wide] (included in $t_{conventional-simultaneous}$) are about the same, for large enough values of N, such as N>>1, for example. Typically, N>16, and, usually, N=$2^t$ for t>4.

The two (N+1)-bit decoded bit-vectors $A = a_N a_{N-1} a_{N-2} a_{N-3} \ldots a_{n+1} a_n a_{n-1} \ldots a_3 a_2 a_1 a_0$ (corresponding to n, so that $a_n=1$ and $a_i=0$ for i n) and $B = b_N b_{N-1} b_{N-2} b_{N-3} \ldots b_{m+1} b_m b_{m-1} \ldots b_3 b_2 b_1 b_0$ (corresponding to m, so that $b_m=1$ and $b_i=0$ for i m) need not arrive simultaneously for exemplary embodiments of implementations of overflow detection according to the present invention to work. The first act includes inputting one of two (N+1)-bit decoded bit-vectors, A (n) or B (m), whichever arrives first, into N−1 N-OR gates to generate an (N+1)-bit one-ahead vector. The second act includes using a MUX having N+1 2-AND gates and an (N+1)-OR gate to detect an overflow by selecting an overflow bit from bits of the (N+1)-bit one-ahead vector using the second of two (N+1)-bit decoded bit-vectors, A (n) or B (m), whichever arrives second.

If there is signal skew, which is often the case, where A (n) arrives earlier to the N−1 N-OR gates than B (m), which arrives at a time $t_{skew}$ later than A (n), then the time $T_{new-skewed} = t_{skew} + t_{2-AND} + t_{(N+1)-OR}$[1-bit wide] (assuming that the time $t_{skew}$ is greater than the time $t_{N-OR}$[(N−1)-bits wide] for using the N−1 N-OR gates in parallel). This may be compared with the time $t_{conventional-skewed} = t_{skew} + t_{conventional-simultaneous} = t_{skew} + t_{2-AND} + t_{(N+1)-OR}$[(N+1)-bits wide]+$t_{N-OR}$[1-bit wide]. The time $t_{new-skewed} = t_{skew} + t_{2-AND} + t_{(N+1)-OR}$[1-bit wide] is less than the time $t_{conventional-skewed} = t_{skew} + t_{2-AND} + t_{(N+1)-OR}$[(N+1)-bits wide]+$t_{N-OR}$[1-bit wide]. The time $t_{conventional-skewed}$ includes $t_{(N+1)-OR}$[(N+1)-bits wide], whereas the time $t_{new-skewed}$ does not, and the times $t_{(N+1)-OR}$[1-bit wide] (included in the time $t_{new-skewed}$) and $t_{N-OR}$[1-bit wide] (included in $t_{conventional-skewed}$) are about the same, for large enough values of N, such as N>>1, for example, as discussed above.

The time $t_{new-skewed} = t_{skew} + t_{2-AND} + t_{(N+1)-OR}$[1-bit wide] (assuming that the time $t_{skew}$ is greater than the time $t_{N-OR}$[(N−1)-bits wide] for using the N−1 N-OR gates in parallel) may also be compared with the conventional N+1 T-gate MUXes delay time $t_{conventional-skewed-T-gate} = t_{skew} + t_{data-to-out}$[(N+1)-bits wide]+$t_{N-OR}$[1-bit wide]. However, if the input size N is large, such as N>>1, for example, as discussed above, then the conventional N+1 T-gate MUXes implementation would introduce a large amount of diffusion capacitance at the output of each T-gate. This would increase the data-to-out time $t_{data-to-out}$[(N+1)bits wide] so that the data-to-out time $t_{data-to-out}$[(N+1)-bits wide]>>$t_{2-AND}$. The time $t_{new-skewed} = t_{skew} + t_{2-AND} + t_{(N+1)-OR}$[1-bit wide] would then be less than the time $t_{conventional-skewed-T-gate} = t_{skew} + t_{data-to-out}$[(N+1)-bits wide]+$t_{N-OR}$[1-bit wide], since the data-to-out time $t_{data-to-out}$[(N+1)-bits wide] (included in $t_{conventional-skewed-T-gate}$) would then be much, much greater than $t_{2-AND}$ (included in the time $t_{new-skewed}$). The times $t_{(N+1)-OR}$[1-bit wide] (included in the time $t_{new-skewed}$) and $t_{N-OR}$[1-bit wide] (included in $t_{conventional-skewed-T-gate}$) are about the same, for large enough values of N, such as N>>1, for example, as discussed above.

There are four basic permutations for arrival times and size, N, of the bit-vectors.

Case 1: Simultaneous input arrival, N small:

The present invention is faster than the traditional method.

Case 2: Simultaneous input arrival, N large:

The present invention is much faster than the traditional method.

Case 3: Skewed input arrival, N small:

The present invention is faster than the traditional method if a typical circuit implementation is used. However, with a T-gate implementation, the present invention and the traditional method give similar arrival times.

Case 4: Skewed input arrival, N large:

The present invention is much faster than the traditional method regardless of the circuit implementation (static AND-OR or T-gate).

In microprocessor applications, such as in an Intel Value Engine (iVE) pipeline, the pipeline advance signals are extremely timing critical. In the iVE front-end, for example, most advance signals depend on the UDQ (or $\mu$DQ, for micro-op-code, or $\mu$-op, Decoupling Queue) occupancy status. If the number of new $\mu$-ops incident upon the Queue exceeds the number of empty entries, a stall signal is generated that determines advance signals for all previous stages. The stall signal is generated by adding the current UDQ occupancy count and the current incoming $\mu$-op count, both represented as decoded bit-vectors. An overflow in this decoded bit-vector addition implies a stall condition. A fast overflow detection, such as presented in the above-given exemplary embodiments of implementations of overflow detection according to the present invention, is essential to making this time-critical path circuit feasible.

The above-described embodiments are illustrative and should not be considered as limiting the scope of the present invention. For example, embodiments according to the present invention may be implemented in an expensive medium, such as in microcode. Such an implementation of embodiments of the present invention for detecting overflow in an add operation on first and second decoded bit-vectors may advantageously occupy less code space than would conventional software for detecting overflow in an add operation on first and second decoded bit-vectors.

What is claimed is:

1. A method for detecting overflow in an add operation on first and second decoded bit-vectors, said method comprising:

generating a one-ahead vector using the first decoded bit-vector; and selecting an overflow bit from bits of the one-ahead vector using the second decoded bit-vector.

2. The method of claim 1, wherein said generating the one-ahead vector includes inputting bits of the first decoded bit-vector into a plurality of first OR-gates.

3. The method of claim 2, wherein said selecting the overflow bit includes inputting the one-ahead vector and the second decoded bit-vector into an AND-gate.

4. The method of claim 3, wherein said selecting the overflow bit further includes inputting the output of the AND-gate to a second OR-gate.

5. The method of claim 1, wherein said selecting the overflow bit includes inputting the one-ahead vector and the second decoded bit-vector into an AND-gate.

6. The method of claim 5, wherein said selecting the overflow bit further includes inputting the output of the AND-gate into a second OR-gate.

7. A method for detecting overflow in adding a first decoded bit-vector $A = a_N a_{N-1} a_{N-2} a_{N-3} \ldots a_{k+1} a_k a_{k-1} \ldots a_3 a_2 a_1 a_0$ and a second decoded bit-vector $B = b_N b_{N-1} b_{N-2} b_{N-3} \ldots b_{k+1} b_k b_{k-1} \ldots b_3 b_2 b_1 b_0$, said method comprising:

generating a one-ahead vector $O_A$ using the first decoded bit-vector A so that the i-th bit $O_A[i]$ of the one-ahead vector $O_A$ is $O_A[i] = OR(a_N, a_{N-1}, a_{N-2}, a_{N-3}, \ldots, a_{i+3}, a_{i+2}, a_{i+1})$ for $0 \leq i \leq N-2$, $O_A[i] = a_N$ for i=N−1, and $O_A[i] = 0$ for i=N; and selecting an overflow bit from bits of the one-ahead vector $O_A$ using the second decoded bit-vector B so that the overflow bit is $OR(AND(O_A[0], b_N), AND(O_A[1], b_{N-1}), \ldots, AND(O_A[N-1], b_1), AND(O_A[N], b_0))$.

8. The method of claim 7, wherein N is at least equal to 4.

9. A method for detecting overflow in adding a first decoded bit-vector $A = a_N a_{N-1} a_{N-2} a_{N-3} \ldots a_{k+1} a_k a_{k-1} \ldots a_3 a_2 a_1 a_0$ and a second decoded bit-vector $B = b_N b_{N-1} b_{N-2} b_{N-3} \ldots b_{k+1} b_k b_{k-1} \ldots b_3 b_2 b_1 b_0$, said method comprising:

generating a one-ahead vector $O_A$ using the first decoded bit-vector A so that the i-th bit $O_A[i]$ of the one-ahead vector $O_A$ is the sum from j=i+1 to N of $a_j$ for $0 \leq i \leq N-1$ and $O_A[i] = 0$ for i=N; and selecting an overflow bit from bits of the one-ahead vector $O_A$ using the second decoded bit-vector B so that the overflow bit is the sum from s=0 to N−1 of the products $(O_A[s] b_{N-s})$.

10. The method of claim 9, wherein N is at least equal to 4.

11. An article of manufacture comprising:

a computer useable medium having a computer readable program code embodied in said medium for causing a computer to detect overflow in an add operation on first and second decoded bit-vectors, said computer readable program code in said article of manufacture including:

computer readable program code for causing said computer to generate a one-ahead vector using the first decoded bit-vector; and computer readable program code for causing said computer to select an overflow bit from bits of the one-ahead vector using the second decoded bit-vector.

12. The article of manufacture of claim 11, wherein said generating the one-ahead vector includes inputting bits of the first decoded bit-vector into a plurality of first OR-gates.

13. The article of manufacture of claim 12, wherein said selecting the overflow bit includes inputting the one-ahead vector and the second decoded bit-vector into an AND-gate.

14. The article of manufacture of claim 13, wherein said selecting the overflow bit further includes inputting the output of the AND-gate to a second OR-gate.

15. The article of manufacture of claim 11, wherein said selecting the overflow bit includes inputting the one-ahead vector and the second decoded bit-vector into an AND-gate.

16. The article of manufacture of claim 15, wherein said selecting the overflow bit further includes inputting the output of the AND-gate into a second OR-gate.

17. An article of manufacture comprising:

a computer useable medium having a computer readable program code embodied in said medium for causing a computer to detect overflow in adding a first decoded bit-vector $A = a_N a_{N-1} a_{N-2} a_{N-3} \ldots a_{k+1} a_k a_{k-1} \ldots a_3 a_2 a_1 a_0$ and a second decoded bit-vector $B = b_N b_{N-1} b_{N-2} b_{N-3} \ldots b_{k+1} b_k b_{k-1} \ldots b_3 b_2 b_1 b_0$, said computer readable program code in said article of manufacture including:

computer readable program code for causing said computer to generate a one-ahead vector $O_A$ using the first decoded bit-vector A so that the i-th bit $O_A[i]$ of the one-ahead vector $O_A$ is $O_A[i] = OR(a_N, a_{N-1}, a_{N-2}, a_{N-3}, \ldots, a_{i+3}, a_{i+2}, a_{i+1})$ for $0 \leq i \leq N-2$, $O_A[i] = a_N$ for i=N−1, and $O_A[i] = 0$ for i=N; and computer readable program code for causing said computer to select an overflow bit from bits of the one-ahead vector $O_A$ using the second decoded bit-vector B so that the overflow bit is $OR(AND(O_A[0], b_N), AND(O_A[1], b_{N-1}), \ldots, AND(O_A[N-1], b_1), AND(O_A[N], b_0))$.

18. The article of manufacture of claim 17, wherein N is at least equal to 4.

19. An article of manufacture comprising:

a computer useable medium having a computer readable program code embodied in said medium for causing a computer to detect overflow in adding a first decoded bit-vector $A = a_N a_{N-1} a_{N-2} a_{N-3} \ldots a_{k+1} a_k a_{k-1} \ldots a_3 a_2 a_1 a_0$ and a second decoded bit-vector $B = b_N b_{N-1} b_{N-2} b_{N-3} \ldots b_{k+1} b_k b_{k-1} \ldots b_3 b_2 b_1 b_0$, said computer readable program code in said article of manufacture including:

computer readable program code for causing said computer to generate a one-ahead vector $O_A$ using the first decoded bit-vector A so that the i-th bit $O_A[i]$ of the one-ahead vector $O_A$ is the sum from j=i+1 to N of $a_j$ for $0 \leq i \leq N-1$ and $O_A[i] = 0$ for i=N; and computer readable program code for causing said computer to select an overflow bit from bits of the one-ahead vector $O_A$ using the second decoded bit-vector B so that the overflow bit is the sum from s=0 to N−1 of the products $(O_A[s] b_{N-s})$.

20. The article of manufacture of claim 19, wherein N is at least equal to 4.

21. A program storage device readable by a machine, tangibly embodying a program of instructions executable by the machine to perform a method for detecting overflow in an add operation on first and second decoded bit-vectors, said method comprising:

generating a one-ahead vector using the first decoded bit-vector; and selecting an overflow bit from bits of the one-ahead vector using the second decoded bit-vector.

22. The program storage device of claim 21, wherein said generating the one-ahead vector includes inputting bits of the first decoded bit-vector into a plurality of first OR-gates.

23. The program storage device of claim 22, wherein said selecting the overflow bit includes inputting the one-ahead vector and the second decoded bit-vector into an AND-gate.

24. The program storage device of claim 23, wherein said selecting the overflow bit further includes inputting the output of the AND-gate to a second OR-gate.

25. The program storage device of claim 21, wherein said selecting the overflow bit includes inputting the one-ahead vector and the second decoded bit-vector into an AND-gate.

26. The program storage device of claim 25, wherein said selecting the overflow bit further includes inputting the output of the AND-gate into a second OR-gate.

27. A program storage device readable by a machine, tangibly embodying a program of instructions executable by the machine to perform a method for detecting overflow in adding a first decoded bit-vector $A=a_N a_{N-1} a_{N-2} a_{N-3} \ldots a_{k+1} a_k a_{k-1} \ldots a_3 a_2 a_1 a_0$ and a second decoded bit-vector $B=b_N b_{N-1} b_{N-2} b_{N-3} \ldots b_{k+1} b_k b_{k-1} \ldots b_3 b_2 b_1 b_0$, said method comprising:

generating a one-ahead vector $O_A$ using the first decoded bit-vector A so that the i-th bit $O_A[i]$ of the one-ahead vector $O_A$ is $O_A[i]=OR(a_N, a_{N-1}, a_{N-2}, a_{N-3}, \ldots, a_{i+3}, a_{i+2}, a_{i+1})$ for $0 \leq i \leq N-2$, $O_A[i]=a_N$ for $i=N-1$, and $O_A[i]=0$ for $i=N$; and selecting an overflow bit from bits of the one-ahead vector $O_A$ using the second decoded bit-vector B so that the overflow bit is $OR(AND(O_A[0], b_N), AND(O_A[1], b_N), \ldots, AND(O_A[N-1], b_1), AND(O_A[N], b_0))$.

28. The program storage device of claim 27, wherein N is at least equal to 4.

29. A program storage device readable by a machine, tangibly embodying a program of instructions executable by the machine to perform a method for detecting overflow in adding a first decoded bit-vector $A=a_N a_{N-1} a_{N-2} a_{N-3} \ldots a_{k+1} a_k a_{k-1} \ldots a_3 a_2 a_1 a_0$ and a second decoded bit-vector $B=b_N b_{N-1} b_{N-2} b_{N-3} \ldots b_{k+1} b_k b_{k-1} \ldots b_3 b_2 b_1 b_0$, said method comprising:

generating a one-ahead vector $O_A$ using the first decoded bit-vector A so that the i-th bit $O_A[i]$ of the one-ahead vector $O_A$ is the sum from $j=i+1$ to N of $a_j$ for $0 \leq i \leq N-1$ and $O_A[i]=0$ for $i=N$; and selecting an overflow bit from bits of the one-ahead vector $O_A$ using the second decoded bit-vector B so that the overflow bit is the sum from $s=0$ to $N-1$ of the products $(O_A[s] b_{N-s})$.

30. The program storage device of claim 29, wherein N is at least equal to 4.

* * * * *

UNITED STATES PATENT AND TRADEMARK OFFICE
CERTIFICATE OF CORRECTION

PATENT NO.    : 6,275,840 B1
DATED         : August 14, 2001
INVENTOR(S)   : Khan et al.

It is certified that error appears in the above-identified patent and that said Letters Patent is hereby corrected as shown below:

Column 3,
Line 7, insert -- ≠ -- between "i" and "n".
Line 8, insert -- ≠ -- between "i" and "m".
Line 9, insert -- ≠ -- between "i" and "m".

Column 6,
Line 3, insert -- ≠ -- between "i" and "n".
Line 5, insert -- ≠ -- between "i" and "m".

Column 7,
Line 11, insert -- ≠ -- between "i" and "n".
Line 13, insert -- ≠ -- between "i" and "m".

Column 13,
Line 9, insert -- ≠ -- between "i" and "n".
Line 11, insert -- ≠ -- between "i" and "m".
Line 52, insert -- ≠ -- between "i" and "m".

Column 15,
Line 24, insert -- ≠ -- between "i" and "m".

Signed and Sealed this

Fourth Day of June, 2002

*Attest:*

*Attesting Officer*

JAMES E. ROGAN
*Director of the United States Patent and Trademark Office*